US010325317B2

(12) United States Patent
Melton

(10) Patent No.: US 10,325,317 B2
(45) Date of Patent: Jun. 18, 2019

(54) IDEAL LATENCY FLOOR

(71) Applicant: Thomson Reuters Global Resources, Baar (CH)

(72) Inventor: Hayden Paul Melton, Philadelphia, PA (US)

(73) Assignee: Refinitiv US Organization LLC, New York, NY (US)

(\*) Notice: Subject to any disclaimer, the term of this patent is extended or adjusted under 35 U.S.C. 154(b) by 786 days.

(21) Appl. No.: 14/533,543

(22) Filed: Nov. 5, 2014

(65) Prior Publication Data

US 2015/0127519 A1 May 7, 2015

Related U.S. Application Data

(60) Provisional application No. 62/029,042, filed on Jul. 25, 2014, provisional application No. 61/900,087, filed on Nov. 5, 2013.

(51) Int. Cl.
*G06Q 40/00* (2012.01)
*G06Q 40/04* (2012.01)

(52) U.S. Cl.
CPC ..................... *G06Q 40/04* (2013.01)

(58) Field of Classification Search
CPC ......... G06Q 40/00; G06Q 40/04; G06Q 40/06
See application file for complete search history.

(56) References Cited

U.S. PATENT DOCUMENTS

| 7,469,324 B2 | 12/2008 | Tene et al. ................. 711/159 |
| 8,533,100 B2 | 9/2013 | Cushing ......................... 705/37 |
| 8,719,146 B2 | 5/2014 | Sellberg |
| 9,667,751 B2* | 5/2017 | Fallon .................... H03M 7/30 |
| 9,672,565 B2* | 6/2017 | Parsons ................. G06Q 40/04 |

(Continued)

FOREIGN PATENT DOCUMENTS

| CA | 2944925 A1 | 4/2016 |
| EP | 1605384 | 12/2005 |

(Continued)

OTHER PUBLICATIONS

Neovest Selects SunGard for Co-location and Direct Market Data Connectivity Business Wire Jun. 9, 2003: 5792.*

(Continued)

*Primary Examiner* — Lalita M Hamilton
(74) *Attorney, Agent, or Firm* — Sheppard Mullin Richter & Hampton LLP

(57) ABSTRACT

The invention relates to a system and method for providing a latency floor for an electronic trading venue in which market participants who can respond within the value the floor and choose to compete in a specific race to make or take a price may each have a substantially equal chance of winning that race. The system may detect and distinguish individual "races" that occur on an electronic trading venue. Upon detection of the first order (or message) in such a race, the system may create a batch and a timer for that race. As orders pertaining to that race are received, they are added to its batch. Upon the timer reaching a predetermined value, typically the value of the floor, the race is determined to have ended and the orders are drained from the batch for processing (e.g., against the instrument's central limit order book (CLOB)).

24 Claims, 4 Drawing Sheets

(56) References Cited

U.S. PATENT DOCUMENTS

| | | | |
|---|---|---|---|
| 2002/0023048 A1* | 2/2002 | Buhannic | G06Q 10/10 705/37 |
| 2002/0178108 A1 | 11/2002 | Tresser | |
| 2004/0042506 A1* | 3/2004 | Fallon | G06Q 40/04 370/521 |
| 2008/0243675 A1* | 10/2008 | Parsons | G06Q 40/00 705/37 |
| 2008/0275806 A1 | 11/2008 | Raitsev | |
| 2008/0301061 A1* | 12/2008 | Kittelsen | G06Q 40/06 705/36 R |
| 2009/0181777 A1 | 7/2009 | Christiani | |
| 2009/0210337 A1* | 8/2009 | Mahoney | G06Q 40/04 705/37 |
| 2010/0036763 A1 | 2/2010 | Driscoll | 705/37 |
| 2011/0040669 A1 | 2/2011 | Lee et al. | 705/37 |
| 2011/0047104 A1 | 2/2011 | Czupek et al. | 705/500 |
| 2012/0054084 A1 | 3/2012 | Wolf et al. | 705/37 |
| 2012/0089496 A1* | 4/2012 | Taylor | G06Q 40/04 705/35 |
| 2013/0275284 A1 | 10/2013 | Messina | |
| 2013/0297478 A1 | 11/2013 | Mannix | 705/37 |
| 2014/0180904 A1* | 6/2014 | Parsons | G06Q 40/04 705/37 |
| 2015/0006349 A1 | 1/2015 | Eddy et al. | 705/37 |
| 2015/0006350 A1 | 1/2015 | Prasad et al. | 705/37 |
| 2015/0066727 A1 | 3/2015 | Wepsic et al. | 705/37 |
| 2015/0073967 A1* | 3/2015 | Katsuyama | H04L 47/12 705/37 |
| 2015/0073970 A1* | 3/2015 | Merold | G06Q 40/04 705/37 |
| 2015/0262297 A1 | 9/2015 | Callaway et al. | |
| 2015/0356679 A1* | 12/2015 | Schmitt | G06Q 40/06 705/37 |
| 2016/0104242 A1 | 4/2016 | Melton | |
| 2016/0364437 A1 | 12/2016 | Djurdjevic | |

FOREIGN PATENT DOCUMENTS

| | | |
|---|---|---|
| JP | 2012515991 | 7/2012 |
| WO | 2001098961 A2 | 12/2001 |
| WO | 2014055130 A1 | 4/2014 |

OTHER PUBLICATIONS

Budish, Eric et al., "The High-Frequency Trading Arms Race: Frequent Batch Auctions as a Market Design Response", Dec. 23, 2013, 70 pages.

Farmer, J.Doyne, "Review of the Benefits of a Continuous Market Vs. Randomised Stop Auctions and of Alternative Priority Rules (policy options 7 and 12)", European Commission Public Consultation; Review of the Markets in Financial Instruments Directive, Mar. 28, 2012, 25 pages.

Harris, Larry, "What to Do About High-Frequency Trading", *Financial Analysts Journal*, CFA Institute, Mar./Apr. 2013, 4 pages.

Jones, Charles M. "What Do We Know About High-Frequency Trading?", Columbia Business School, Version 3.4, Mar. 20, 2013, 56 pages.

Budish, Eric et al, "Implementation Details for Frequent Batch Auctions: Slowing Down Markets to the Blink of an Eye", *American Economic Review*, vol. 104, No. 5, May 2014, 7 pages.

Szalay, Eva, "Life in the Slow Lane", printed from http://www.automatedtrader.net/articles/exchange-views/144193/life-in-the-slow-lane, *Automated Trader Magazine*, Issue 30, Q3 2013, 2 pages.

Onstad, Eric et al., "Analysis: 'Slow Frequency' Technology Faces Tough Shift from FX to Stock Markets", printed from http://www.reuters.com/article/2013/10/02/us-hft-curbs-analysis-idUSBRE9910PJ20131002, Oct. 2, 2013, 4 pages.

Gordon, Ethel Sherry, "New Problems in Queues: Social Injustice and Server Production Management", Ph.D. Thesis, Massachusetts Institute of Technology, Department of Nuclear Engineering, copyright 1987, 436 pages.

"Not All Speed Bump Markets are Created Equal: Unintended Consequences, Conflicts of Interest and the Chaos that will Stem from a Partial Order Protection Rule", An Aequitas Neo Exchange Position Paper, Jul. 2015, 6 pages.

Aldrick, Philip, "The Brit Beating the Forex Flash Boys in Less Time than the Blink of an Eye: High-Frequency Trading is Timed in Milliseconds, But It Has Taken Several Years to Challenge It", The Times, Nov. 21, 2015, 6 pages.

Alpha Exchange Inc., Notice of Proposed Rule Amendments and Request for Comments on the Trading Policy Manual, URL: <http://www.osc.gov.on.ca/documents/en/Marketplaces/alpha-exchange_20141106_amd-request-for-comments.pdf>, 59 pages.

Curex FX ECN Index Liquidity Pool Rules, Version 3, Dec. 19, 2014, Curex Innovations LLC, 9 pages.

Osipovich, Alexander, "New York Stock Exchange Adopts 'Speed Bump' for One of Its Markets", The Wall Street Journal, Jan. 25, 2017, 2 pages.

Securities and Exchange Commission, Filing by Chicago Stock Exchange, "Proposed Rule Change to Adopt the CHX Liquidity Taking Access Delay", File No. SR-2016-16, <URL: http://www.chx.com/_posts/rule-filings/ProposedFilings/CHX-2016-16.pdf>, Sep. 6, 2016, 123 pages.

Whitt, Ward, "The Amount of Overtaking in a Network of Queues", Networks, vol. 14, Issue 3, Fall 1984, Wiley Online Library, pp. 411-426.

Sellberg, Lars-Ivar, "Using Adaptive Micro Auctions to Provide Efficient Price Discovery When Access in Terms of Latency is Differentiated Among Market Participants", White Paper, Cinnober Financial Technology AB, Oct. 20, 2010, 8 pages.

Mannix, Brian F., "Regulatory Studies Center: Public Interest Comment on the Security and Exchange Commission's Market Technology Roundtable", The George Washington University, SEC Release No. 34-67802, SEC File No. 4-652, Oct. 23, 2012, 20 pages.

Brown, Alasdair, et al., "Slowing Down Fast Traders: Evidence from the Betfair Speed Bump", School of Economics, University of East Anglia, Norwich, U.K., Jun. 21, 2016, 51 pages.

Eholzer, W., "Some Insights Into the Details that Matter for High-Frequency Trading!", Eurez Exchange's T7, www.eurexchange.com, Nov. 2013, 40 pages.

Gode, Dhananjay K., et al., "Designing Electronic Markets: On the Impossibility of Equitable Continuously-Clearing Mechanisms with Geographically Distributed Agents", <URL: https://www.frbatlanta.org/-/media/documents/filelegacydocs/ACF35B.pdf>, Feb. 2000, 12 pages.

Gode, Dhananjay K., et al., "On the Impossibility of Equitable Continously-Clearing Markets with Geographically Distributed Traders", <URL: http://faculty.som.yale.edu/shyamsunder/Research/Experimental%20Economics%20and%20Finance/Presentations%20and%20Working%20Papers/Network/Design13march2000.pdf>, Feb. 2000, 15 pages.

"Turquoise Uncross" Factsheet, London Stock Exchange Group, <URL: http://www.lseg.com/sites/default/files/content/documents/Turquoise%20Uncross%20Factsheet.pdf>, 2016, 1 page.

Aquilina, Matteo, et al., "Dark Pool Reference Price Latency Arbitrage", <URL: http://ifrogs.org/PDF/CONF_2017/Aquilina_Foley_Oneill_Ruf_2017.pdf>, May 10, 2017, 55 pages.

\* cited by examiner

IDEAL LATENCY FLOOR

CROSS-REFERENCE TO RELATED APPLICATIONS

This application claims priority to U.S. Provisional Patent Application No. 61/900,087, filed Nov. 5, 2013, entitled "Random Delay Mechanism," and U.S. Provisional Patent Application No. 62/029,042, filed Jul. 25, 2014, entitled "An Ideal Latency Floor," the contents of which are incorporated by reference in their entireties herein.

FIELD OF THE INVENTION

The invention relates to a system and method for providing a Latency Floor (which is sometimes also referred to as Randomization) for an electronic trading venue.

BACKGROUND OF THE INVENTION

There are a vast number of electronic trading venues in operation around the world. The majority of these large, electronic trading venues operate with time-priority rules for the processing of orders. In other words, these venues process messages (e.g., orders, cancels, replaces) sent by market participants in the temporal order in which they are received. Because of this, on these venues, the "fastest" market participants are advantaged in their trading activities, both in terms of price making and price taking, as described in Farmer, J. D., Skouras, S. *Review of the benefits of a continuous market vs. randomised stop auctions and of alternative Priority Rules (policy options 7 and 12)*. Paper for UK Govt Office for Science. 28 Mar. 2012, the content of which is incorporated by reference in its entirety herein. In this context "fastest" means being able to send an order (or other message) to an electronic trading venue in response to some stimulus (often a market data update) in the least amount of time.

In the past few years market participants engaged in high frequency or algorithmic trading (herein, simply "HFT") have been responsible for an increasing proportion of the trading volumes transacted on these electronic trading venues. Although certain studies have shown that HFT has resulted in improved liquidity provision (e.g., through tighter spreads), as described in Jones, C M. *What do we know about high frequency trading?* Working Paper, Columbia Business School. Version 3.4: Mar. 20, 2013, the content of which is incorporated by reference in its entirety herein— other studies have identified some negative effects of HFT, as described in Budish, E., Cramton, P., Shim, J. *The High-Frequency Trading Arms Race: Frequent Batch Auctions as a Market Design Response*. Working Paper. Dec. 23, 2013, the content of which is incorporated by reference herein in its entirety.

The operators of trading venues and their customers, who are market participants on those trading venues, have been significantly impacted by the rise of HFT. Some market participants have stated that they can no longer afford to make ongoing, significant and sometimes operationally risky investments in cutting edge technology that is required to keep up with the fastest participants. The result of this is that on the many venues with time-priority rules for processing messages, where speed consequently plays a role in determining competitiveness in price making and taking, fewer participants can effectively compete, and competition as a whole on the venue is seemingly reduced by HFT. This is arguably "bad" because a healthy market may be one that encourages competition through "inclusiveness": by enabling a broader rather than narrower set of participants to compete in price making and taking.

The operators of electronic trading venues have themselves been affected by the rise of HFT. As market participants have become faster and faster, smaller and smaller variations in latency on a venue have become increasingly significant in determining which market participant is the most successful in their ability to make or take a price. While the nature of computer hardware and software (and ultimately the laws of physics) make it impossible to completely eliminate all variation in latency on an electronic trading venue, it becomes increasingly difficult and expensive for a market operator to monitor and control smaller and smaller variations in latency. Yet a market operator is obliged to do so in order to ensure their venue is "fair" i.e., that no single participant is systematically advantaged (or disadvantaged) in their price making and taking activities as a result of the particular manifestation of latency "jitter" on the venue.

A Latency Floor (also referred to as Randomization as described in Harris, L. *What to Do about High-Frequency Trading*. Financial Analysts Journal, March/April 2013, Vol. 69, No. 2: 6-9 and Szalay, E. *Life in the slow lane*. Automated Trader Magazine Issue 30 Q3 2013, both of which are incorporated by reference in their entireties herein) can be thought of as a limited exception to the time-priority rule an electronic trading venue implements. The outcome of deploying a latency floor mechanism on a venue that operates a central limit order book (CLOB) is that at short timescales messages are not generally processed against the CLOB (e.g., inserted into it, matched against other orders in it, removed from it, and so on) in the temporal order in which they are received. At longer timescales however, messages received earlier are still processed against the CLOB before messages received later. What this implies is that there is a time parameter associated with a latency floor that distinguishes the short timescale from the long. This same time parameter is sometimes referred to as the "value" of the latency floor.

A latency floor mechanism may work by "batching" up messages received within the floor's value before those messages reach the CLOB, shuffling the list of messages in the batch to give the list a new (at least somewhat) random ordering, and then finally processing these messages against the CLOB according to their new random ordering. In this way the order in which the messages are processed against the CLOB is no longer completely determined by the temporal order in which they were received. Other such mechanisms may instead work by adding a random delay between 0 and the (floor) value to each message when it is received and before it can be processed against the CLOB, thereby also causing a new, more random ordering of messages, as described in Harris, L. *What to Do about High-Frequency Trading*. Financial Analysts Journal, March/April 2013, Vol. 69, No. 2: 6-9.

It is observed that conventional latency floor mechanisms do not completely eliminate the advantage of being able to respond faster than the value of the floor. In other words, on an electronic trading venue implementing a conventional latency floor mechanism, there is still incentive for market participants on that venue to be able to respond in less time than (i.e., be faster than) the value of the floor, and indeed to be the absolute fastest. For example, in one such conventional mechanism, if the value of the floor is 2 milliseconds (ms), and the faster participant responded 1.8 ms ahead of the slower participant, the faster participant's message will still have a greater than 90% chance of being processed against the CLOB before the slower participant's message. Consequently with conventional latency floors, and although to a lesser degree than with strict time-priority processing of messages, there is still incentive to invest in technology to be the absolute fastest participant and market operators still need to monitor and control venue latency at increasing levels of precision. These problems and other drawbacks are suffered by conventional latency floors.

SUMMARY OF THE INVENTION

The invention addressing these and other drawbacks relates to a system and method for detecting and distinguishing individual "races" that naturally occur on an electronic trading venue and pertain to price making and taking activity among market participants on that venue. On venues that operate CLOBs for the instruments that trade on them there are two types of price taking races: a race to take (or equivalently "hit", or "aggress", or "lift") the bid, and a race to take the offer. Similarly, on such venues, there are price making races each type of which may be uniquely identified by the pair of a maker order's side (buy or sell) and limit price. An important property of the invention (herein "ideal latency floor") is that in any given instance of a race all participants who choose to compete in that race, and can respond within the value of the floor, all have a substantially equal chance of winning it.

At a high level the ideal latency floor works by: (1) detecting the first message in a specific type of race at the time it is received by the venue, (2) starting a timer upon detection of that first message, (3) "batching" the first message together with other messages that also belong to that race type and that are received by the venue before the timer has reached a predetermined value (typically the value of the floor), (4) grouping messages in the batch by participant (or other similar entity) and in doing so creating a list of participants who were involved in the race, (5) shuffling that list of participants so as to arrive at a random ordering, and (6) using that shuffled list of participants as input to a predetermined "drain" strategy that, when the race's timer has reached its value, removes the messages from the batch for processing against the CLOB in a manner and sequence that is equitable to the participants given the race type. For a given instrument, a plurality of races may be "active" at any given time, each of which has its own set of messages, its own batch and its own timer, and so on, and that may be processed in the steps (1) through (6) set forth above independently of the processing of those steps for other active races on that instrument.

In an implementation, the system may determine whether to implement an ideal latency floor for all types of races or a subset of types of races based on a configurable parameter. For example, using the system, a user such as a market operator may specify that only price taker races should be subject to the ideal latency floor mechanism while other types of market races such as price maker races should not. In this configuration messages in taker races would be subject to batching and delay, whereas messages that pertain to maker races would likely be processed against the CLOB "in real time", in the temporal ordering in which they were received (or in the manner the venue would ordinarily process them in the absence of a latency floor). In this manner, the user may define which ones of the market races will be subject to the ideal latency floor mechanism.

In an implementation, the system may determine which specific messages can trigger (or equivalently initiate, or be the first message in) a batching period based on configurable parameters. For example, using the system, a user such as a market operator may specify that both orders that "cross" top of book (e.g., buy orders with limit price greater than or equal to the best (lowest) prevailing ask price on the venue) trigger a batching period, as do cancel requests for orders that exist at top of book on the opposing side of the book. Or the venue operator might choose to exclude such cancels as a message type that triggers the start of a batching period for taker races, allowing only taker orders to trigger such batching. In this manner, the user may define which messages trigger which type of races in the ideal latency floor mechanism.

In an implementation, and independently from the triggering of batches above, the system may determine which specific messages are eligible for inclusion in a batch after the batch has initially been created (i.e., after at least one message has been placed in the batch). For example, using the system, a user such as a market operator may specify that only after a batch has been created, but before its timer has reached its value, cancels on sell orders will be included in the batch for a taker race to buy. Alternatively, the user may specify such cancels may never appear in a taker race to buy. In this manner, the user may define which messages are included in a batch after that batch has been triggered (i.e., after it has been created but before its timer has reached the value) in the ideal latency floor mechanism.

In an implementation, the system may group messages received during the batching period by the market participant (or similar entity) that generated those messages. Within each group of orders, the system may retain the temporal ordering in which those messages in that group were received. For instance, all messages received from a first market participant during the batching period may be grouped together into a first set of messages from the first market participant in the temporal order in which they were received. Likewise, all messages received from a second market participant during the batching period may be grouped together into a second set of messages from the second market participant in the temporal order in which they were received, and so on. In this implementation, the system may create a list of market participants associated with the orders and shuffle the list of market participants such that in the resulting shuffled list of market participants, each market participant will have an equal probability of appearing at each position in the shuffled list. The system may then use the ordering of the shuffled list of market participants and the ordering of their group of messages to begin to "drain" messages for processing against the CLOB, as described below. In this manner, a given market participant may not benefit by submitting multiple messages.

In implementations in which messages are grouped based on market participants, the system may employ multiple, distinct strategies to drain messages from the batch for processing against the CLOB. In one such strategy, until there are no messages left in the batch, the shuffled list of participants is repeatedly iterated over removing a single message for each participant for processing against the CLOB before moving onto the next participant with messages remaining in the batch. In another such strategy the list of participants in the batch may be iterated over once, and all a participant's messages are removed from the batch for processing against the CLOB before moving onto the next participant. In yet another such strategy, the orders appearing in the batch are subject to being split into smaller "child" orders where the sum of the quantities of the child orders is equal to the total quantity of their "parent" order in the batch, and the child orders (not the parent order) are processed against the CLOB. Advantageously, in this strategy a small amount of the total quantity across all orders submitted by each participant may be processed against the CLOB in a round-robin fashion thereby eliminating the advantage a participant might obtain in other draining strategies by submitting either multiple small orders for a certain quantity, or a single large order for that same quantity.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
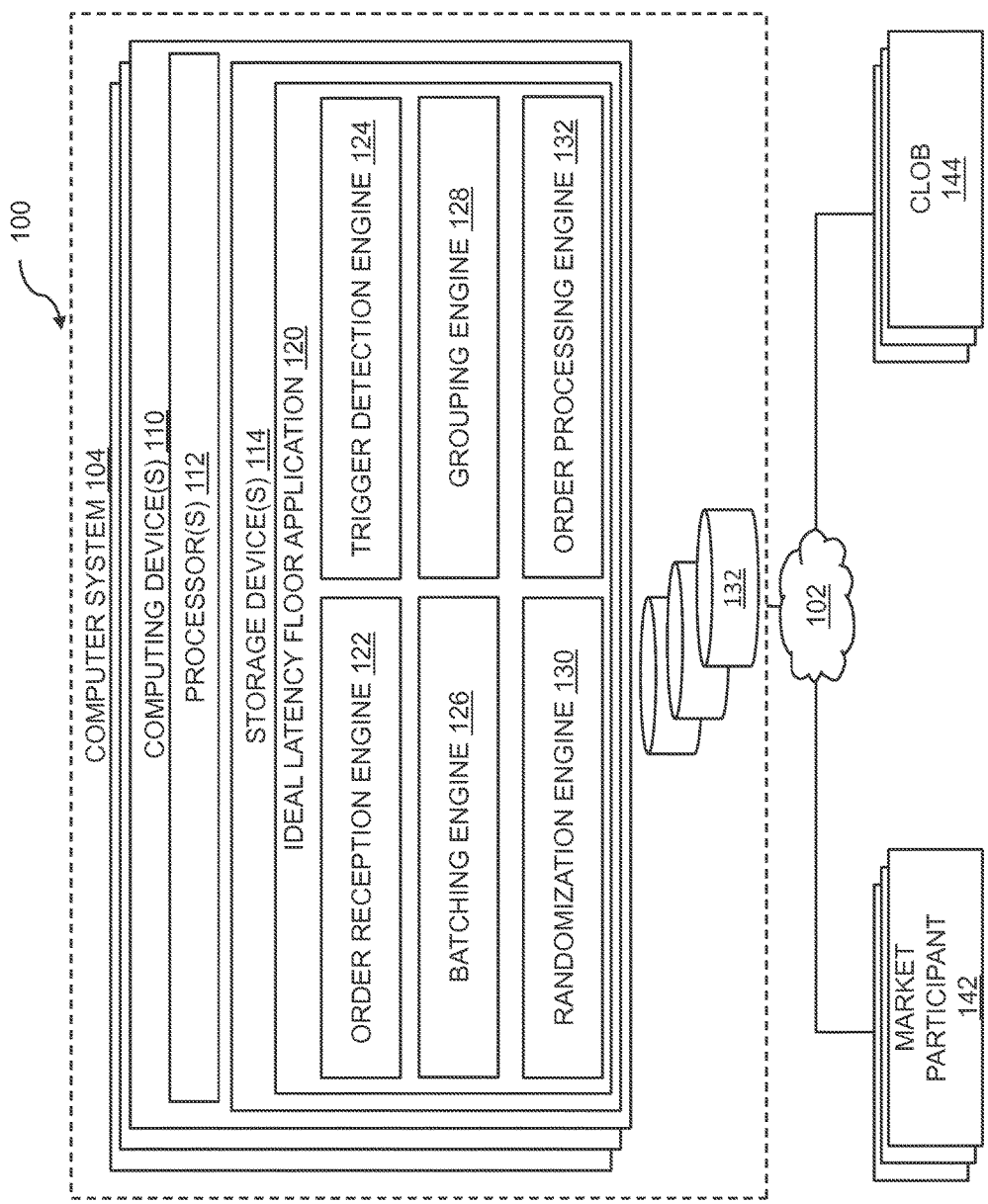
FIG. 1 illustrates a system of providing an ideal latency floor mechanism, according to an implementation of the invention.

FIG. 1 illustrates a system 100 for providing an ideal latency floor mechanism, according to an implementation of the invention. System 100 may facilitate a market race in which market participants who compete in the race (e.g., by choosing to make or take a price) and are able to respond within a value of a latency floor are added to a batch in which each market participant has an equal probability of winning the market race, according to an implementation of the invention. As used herein, the terms "market race" and "race" may be used interchangeably throughout. Likewise, the terms "market participant" and "participant" may be used interchangeably throughout. Further, the term central limit order book or (CLOB) as it is used throughout is not intended to be limiting, and indeed the ideal latency floor mechanism may equally apply to other such structures implemented by a venue (e.g., structures used for the purpose of matching buy orders with sell orders, for providing a view of supply and demand for an instrument traded on that venue, and so on).

Various examples used herein throughout may refer to examples of an ideal latency floor mechanism, although other uses and implementations of system 100 are contemplated and will be apparent to those having skill in the art using the disclosure herein. Having described a high level overview of some of the system functions, attention will now be turned to various system components that facilitate these and other functions.

System Components

System 100 may include a computer system 104, one or more databases 132, one or more market participants 142, an electronic order book 144, and/or other components. To facilitate these and other functions, computer system 104 may include one or more computing devices 110. Each computing device 110 may include one or more processors 112, one or more storage devices 114, and/or other components. Processor(s) 112 may be programmed by one or more computer program instructions, which may be stored in storage device(s) 114. The one or more computer program instructions may include, without limitation, ideal latency floor application 120.

Ideal Latency Floor Mechanism

Ideal latency floor application 120 may execute an ideal latency floor mechanism in which market participants 142 who compete in the race (e.g., by choosing to make or take a price) and are able to respond within a value of a latency floor are added to a batch in which each market participant has an equal probability of winning the market race. For convenience, an ideal latency floor mechanism will be described as performing an operation, when, in fact ideal latency floor application 120 programs one or more processor(s) 112 (and therefore computer system 104) to perform the operation.

In an implementation, the ideal latency floor mechanism may sit between a socket that receives messages off a computer network, and the CLOB 144 against which those messages are ultimately processed. Before a message is processed against the CLOB 144, and after it has been pulled off the socket, it may be processed by the ideal latency floor mechanism. Market participants 142 may see only the state of CLOB 144 in market data updates, not the messages contained in any batches in the ideal latency floor mechanism.

Race Types and how they are Handled by the Ideal Latency Floor Mechanism

Races may generally fall into two categories: maker races and taker races. An individual taker race can be uniquely identified by the side of the order, and the fact the order price "crosses" the book (i.e., would fill against the current or recent state of CLOB 144 based on price). For instance, a buy order may be said to "cross the book" if its limit price is greater than or equal to the best (lowest priced) prevailing sell order (offer) in the CLOB. An individual maker race can be uniquely identified by the pair of side of the order, and limit price of the order. An order in a maker race does not cross the book (i.e., could not be matched against an order of the opposite side that exists in the current or recent state of the CLOB 144, based on price, and optionally credit).

Table 1 illustrates non-limiting examples of race types and how an ideal latency floor mechanism may handle the race types. The following table is included solely to illustrate aspects of the disclosure.

| "RACE TYPE" | INSTANCES | MESSAGE TYPES THAT MAY BE INCLUDED IN THE RACE AFTER IT HAS BEEN TRIGGERED | MESSAGES THAT MAY TRIGGER "RACE" |
|---|---|---|---|
| Taker Race, i.e., where participants race to take a price out of the market. | Race to sell as taker/Race to buy as taker, i.e., one race per side of book | All orders that cross the book i.e., have buy price greater than or equal to the best ask price, or that have sell price less than or equal to the best bid price Cancel request messages for orders in the opposite side of book to the taker race | All orders that cross the book Cancel requests for maker orders that are at top of book, cancels on sell orders being included in taker buy races, and cancels on buy orders being include in taker sell races. |
| Maker Race, i.e., where participants race for a favorable position in temporal queue at that price level in CLOB | Race to post bid/offer at given price level. i.e., one race per pair of side and limit price | All orders that do not cross the book i.e., that have buy price strictly less than best ask, or sell price strictly greater than best bid | All orders that do not cross the book |

Configuration Parameters

Table 2 illustrates non-limiting examples of dimensions, configurable parameters, and brief description of whether a given race type will be subject to the ideal latency floor mechanism described herein. For example, the ideal latency floor mechanism may configurable along the following dimensions, on a per instrument basis, as illustrated in Table 2 below. The following table is included solely to illustrate aspects of the disclosure.

| Dimension | Parameters (per Instrument) | Explanation |
|---|---|---|
| Which race types are included? | Maker_Races: Boolean Taker_Races: Boolean | If Maker_Races is true, then maker races are included in the mechanism. If Taker_Races is true, then taker races are included in the mechanism. If both are true, both race types are included. If both are false, the mechanism is disabled. |
| Are cancels are included in the taker race batching? | Cancels_In_Batching: Boolean | Parameter only has meaning when Taker_Races is true. If Cancels_In_Batching is true then cancel messages get included in the batch of messages collected for a taker race (specifically, cancels on bid orders go into the sell taker race batch; cancels on offer orders go into the buy taker race batch). If Cancels_In_Batching is false then cancel messages are processed against CLOB in real-time. |
| Do cancels for bids/offers at Top of Book cause the batching period to start? | Cancels_Trigger: Boolean | Parameter only has meaning if Taker_Races is true, and Cancels_In_Batching is true. If Cancels_Trigger is true then cancel messages for orders at the top of book also trigger the batching period (so either an order that crosses top of book or a cancel at top of book triggers the batching period, whichever is received first). If Cancels_Trigger is false then only orders that "cross" top of book trigger the batching period |

-continued

| Dimension | Parameters (per Instrument) | Explanation |
|---|---|---|
| What is the value of the floor? | Floor_Lower: double<br>Floor_Upper: double | Parameters only have meaning if one or both Maker_Races and Taker_Races is true, and Floor_Lower and Floor_Upper must be both be greater than zero. Floor_Upper must be greater than or equal to Floor_Lower. Unit of parameters is milliseconds. If Floor_Lower equals Floor_Upper then the floor will have a fixed value specified in these variables If Floor_Lower less than Floor_Upper then each time a batch period is triggered, the amount of time that batching period shall run for will be a random, continuous value uniformly distributed between Floor_Lower and Floor_Upper, inclusive. |
| How are orders drained from each batch? | Maker_At_Once: Boolean<br>Taker_At_Once: Boolean | Maker_At_Once only has meaning if Maker_Races is true<br>Taker_At_Once only has meaning if Taker_Races is true<br>If Maker_At_Once is true then for maker races an entire participant's orders in a batch will be drained before moving onto the next participant's orders. Same for Taker_At_Once and taker races.<br>If Maker_At_Once is false then for maker races then one order will be removed from each participant's order at a time, in a round robin fashion, until all orders are drained from all participants. Same for Taker_At_Once and taker races. |

Operation of the Ideal Latency Floor Mechanism

The ideal latency floor mechanism may operate on various types of market races (such as those described in Table 1) based on various configurable parameters (such as those described in Table 2). In operation, the ideal latency floor mechanism may detect the first order in a market race and create a "batch" for that specific market race. The ideal latency floor mechanism may start a timer that when expired or otherwise reaches a certain value, indicates an end of the batch. As additional orders are detected for that same market race, and before the batch's timer has expired, the additional orders are placed in the batch. When the batch's timer has expired, the orders are shuffled and the ordering resulting from the shuffling is the order in which the orders are processed against CLOB 144.

Pseudo-code and accompanying description of an implementation of an ideal latency floor mechanism particularly with respect to detecting the first order in a race, and batching those orders until such time as the timer has expired, is described below by way of illustration and not limitation. Other implementations of an ideal latency floor mechanism may be used as well, based on the disclosure provided herein.

```
1:  Let Q be the queue of incoming orders on a given instrument;
2:  Add each order to the last position of Q in the temporal
       order they are received from market participants on the
       given instrument;
3:  Let C be the CLOB for the given instrument;
4:  Let M be a map with the pair of [order side, order price] as key and a
    list of orders as the value for the given instrument
5:  Let F be the value of the latency floor e.g., F=2ms
6:  while (true) {
7:     for (Entry E in M) {
8:        Orders os = E.getValue( );
9:        Order o = os.getFirst( );
10:       if (current_time( ) >= o.getTimestamp( ) + F) {
11:          shuffleAndProcess (E.getKey( ),os,C);
12:          M.remove(E.getKey( ));
13:       }
14:    }
15:    for (int i = Q.size( ); i>0; i--) {
16:       Order o = Q.removeFirst( );
17:       Price p = o.getPrice( ); //the limit price of the order
18:       Side s = o.getSide( ); //side is generally 'buy' or 'sell'
19:       if (p >= C.getBestAskPrice( ) && s is buy) {
20:          p = +infinity;
21:       } else if (p <= C.getBestBidPrice( ) && s is sell) {
22:          p = −infinity;
23:       }
```

```
24:      Orders os = M.getOrPutEmptyListIfKeyAbsent([s,p]);
25:      os.addLast(o);
26:   }
27: }
```

Lines 1-3 are as described in the code, but to elaborate further: the queue Q of line 1 is continually replenished by orders submitted by market participants on a given instrument. Line 2 indicates that the orders are placed at the end of the queue, so the ordering of that queue reflects the temporal ordering in which orders are received. Line 3 defines the CLOB C for the given instrument; the CLOB generally comprises buy and sell maker orders and the orders it contains generally change each time a market participant submits a message for the instrument to which the CLOB pertains.

Line 4 defines a Map M which is a standard and widely-used data structure for mapping keys to values. They keys of the map uniquely identify each race type; the values of the map are the orders participating in that market race.

Line 5 declares F, the value of the floor, which may be an integer constant defining the length of the latency floor in some unit of time e.g., milliseconds (ms).

Line 6 is the "infinite" while loop that is executed while an electronic trading venue is operating (accepting orders/messages).

Lines 7-14 are for draining the batch of orders when the timer has tolled (e.g., expired) in the active market races.

Line 7 is a for-loop that iterates over all the entries E in the map. An Entry is the pair of a key and value in the map.

Line 8 returns the value i.e. the list of orders, os, in a given race.

Line 9 obtains the first order o in the given race, i.e., the order that caused the timer to start, without removing it from the list os.

Line 10 checks to see if the timer has tolled for that market race by comparing the timestamp of when the first order was received (o.getTimestamp( )) to the current wall clock time (current_time( )) as determined by a computer's clock or other time source. If the current time is after the timestamp of the order plus the value of the floor F, then the timer has indeed tolled and the orders should be shuffled and processed against CLOB. Though the precise implementation of the shuffling of the list of orders os is not shown in the pseudo-code, nor is the processing of orders against the CLOB, C, the body of the method on line 11, shuffleAndProcess( . . . ) would perform such shuffling and processing. The specific manner in which the shuffleAndProcess( . . . ) method operates may be implemented as described in the section entitled "Shuffling the batch and processing orders from the shuffled batch" below.

On line 12 the entry (both key and value) for the market race is removed so the orders in the map's value are not processed against C more than once. Line 12 also ensures that only active market races i.e., market races where the timer has not tolled, remain in M from one iteration of the outer while-loop to the next.

Lines 15-26 detects the start of a given type of market race, and if such a market race has already begun adds orders to that market race's list or batch of orders.

Line 15 is a for-loop that ensures that all orders that have been received since the last iteration of the outer while-loop are processed (drained).

Line 16 removes the first order currently in Q.

Lines 17 and 18 get the price and side of the order. Assume for this example that all orders have a limit price (for now assume there are no so-called "market orders", which by definition do not have a limit price), and that all orders have just one side which is either buy or sell. If "market orders" to buy are understood to have a limit price of +infinity, and "market orders" to sell are understood to have a limit price of −infinity then the code will work as written with market orders too, not just limit orders.

Lines 19-23 handle races to "aggress" or "take" liquidity out of the market. The methods on C getBestBidPrice( ) and getBestAskPrice( ) in this line range return the price of the highest priced buy order that exists in the CLOB and the price of the lowest priced ask order that exists in the book at the instant these methods are called. Because orders in a race to take or aggress the market need not have the same limit price as one another in order to compete in that race, the limit prices of these orders are as stored in p are instead adjusted to two special values +infinity and −infinity, respectively. This adjustment is to ensure the key is the same for all orders racing to aggress the ask book, and separately for all orders racing to aggress the bid book. At most there will be one buy taker race and one sell taker race active.

On line 24 the list of orders that are participating in a race is obtained via a call to M.getOrPutEmptyListIfKeyAbsent([s,p]). Although the implementation of getOrPutEmptyListIfKeyAbsent( ) is not shown it is to be understood that if the key [s,p] exists in the map the value will have already been initialized, and that value which is a list of orders in the race, os, will be returned. If not, then a new empty list of orders, os, will be created as a value for this key [s,p] by this method on M, and subsequently the first order will be added to that empty list per line 25.

Line 25 adds the order o to the end of the list os.

Line 27 closes the outer while-loop.

For the avoidance of doubt, the keys in M above may uniquely identify each race type. In an alternative implementation, a market operator may focus on establishing an ideal latency floor for certain types of races, such as races to take prices only. In this taker only race implementation, the map M may only contain at most two keys at once (orders racing to aggress the bid, and orders racing to aggress the offer); all other orders may be processed against the CLOB in real-time or in the manner the venue would operate in the absence of an ideal latency floor. This may all be achieved by the small change in the code section 15-26, shown below. In this code C.process(o) has the same meaning as described in the first pseudo-code listing in this document; "continue" is a keyword with the same semantics with respect to loops as in the Java™ programming language. Line 25 adds the order o to the end of the list os.

```
15:   for (int i = Q.size( ); i>0; i--) {
16:      Order o = Q.removeFirst( );
17:      Price p = o.getPrice( ); //the limit price of the order
18:      Side s = o.getSide( ); //side is generally 'buy' or 'sell'
19:      if (p >= C.getBestAskPrice( ) && s is buy) {
20:         p = +infinity;
21:      } else if (p <= C.getBestBidPrice( ) && s is sell) {
22:         p = −infinity;
23:      } else {
         C.process(o);
         continue;
      }
24:      Orders os = M.getOrPutEmptyListIfKeyAbsent([s,p]);
25:      os.addLast (o);
26:   }
```

Shuffling the Batch and Processing Orders from the Shuffled Batch

The manner in which the ideal latency floor mechanism may shuffle the "batch" of orders in a given race is as follows. The ideal latency floor mechanism may group the orders by market participant 142 (e.g., based on the market participant who submitted the orders). The temporal ordering in which each market participant's orders are received may be retained. The ideal latency floor mechanism may generate a list of market participants that are associated with orders in the batch. The ideal latency floor mechanism may then shuffle the list of market participants in the batch such that each market participant has an equal chance of appearing at each position in the list of market participants. The orders are then drained from the batch for processing against CLOB 144 by either repeatedly iterating over the list of participants removing one order from one participant at a time; or by iterating over the entire list of participants only once and removing (and processing against the CLOB) all messages from each participant before moving onto the next.

Round-Robin Draining

In a round-robin draining operation, the system may randomly select a winning market participant from among the batched market participants and fill its first order (e.g., the first order received from the winning market participant) to the extent possible. If more orders are available to be filled, the system may randomly select a next market participant from among the batched market participants (e.g., the second one to be selected), and fill its first order (e.g., the first order received from the next market participant) to the extent possible, and so on. Once the last market participant has been selected, the system may repeat the process for the second orders of each market participant, and so on, until all orders have been filled or no more orders are available to be filled. Of course, random selections of market participants may be made individually or based on a randomly assigned ordering of the market participants.

Pseudo-code and accompanying description of an implementation of a round-robin draining operation performed by ideal latency floor application 120 is this described below by way of illustration and not limitation. Other implementations of draining operations may be used as well, based on the disclosure provided herein.

```
1: Map<Participant,LinkedList<Order>> m = ... //m contains
       participant's orders in batch
2: LinkedList<Participant> ps = new
       LinkedList<Participant> (m.keySet( ));
3: Collections.shuffle(ps);
4: int remainingOrders;
5: do{
6:     remainingOrders = 0;
7:     for (Participant p : ps) {
8:         LinkedList<Order> os = m.get(p);
9:         if (os.size( ) > 0) {
10:            Order o = os.removeFirst( );
11:            processAgainstClob(o);
12:            remainingOrders += os.size.( );
13:        }
14:    }
15: } while (remainingOrders > 0);
```

Line 1 is the Map of market participants 142 to their orders (messages) that were subject to that batch (race).

Line 2 makes a copy of the participants which are the keys in the Map.

Line 3 shuffles the (ordered) list of participants, in a way such that every participant has a substantially equal chance of appearing at each position in the list.

Line 4 is the variable that will hold the count of remaining orders; each iteration of the do-while loop beginning on line 5.

Line 6 sets the number of remaining orders to zero.

The for-loop beginning on Line 7 causes the round-robin draining operation to iterate over the list of participants, removing one order (or equivalently message) from each participant's list of orders at each iteration. As each order is removed it is processed against the CLOB per line 11. The number of orders remaining (i.e., that have not yet been processed) in this participant's list of orders is obtained and increments the total number of remaining orders in line 12.

The termination condition for the do-while loop is for no orders to be remaining (i.e., for all orders to have been processed against the CLOB). A non-limiting example is provided by way of illustration and not limitation. If the batch contains orders a1, a2, and a3 from participant A, and order b1 from participant B, and orders c1 and c2 from participant C, then the Map can be represented as follows, where "→" indicates a mapping from key to value, and ";" delimits pairs of keys and values, and where "{" and "}" demarcate the beginning and end of the map's contents, respectively:

{A→[a1,a2,a3];B→[b1];C→[c1,c2]}

If the shuffling of the map's keys (i.e., the participants) results in the ordered list [C,A,B] then the order in which the messages will be processed against the CLOB is as follows:

[c1,a1,b1,c2,a2,a3]

Participant-at-Once Draining

In a participant-at-once draining operation, the system may randomly select a winning market participant from among the batched market participants and fill all of its orders to the extent possible. If more orders are available to be filled, the system may randomly select a next market participant from among the batched market participants (e.g., the second one to be selected), and fill all of its orders to the extent possible, and so on. Of course, random selections of market participants may be made individually or based on a randomly assigned ordering of the market participants.

Pseudo-code and accompanying description of an implementation of a participant-at-once draining operation performed by ideal latency floor application 120 is this described below by way of illustration and not limitation. Other implementations of draining operations may be used as well, based on the disclosure provided herein.

```
1: Map<Participant,LinkedList<Order m = ... //m contains
       participant's orders in batch
2: LinkedList<Participant> ps = new
       LinkedList<Participant> (m.keySet( ));
3: Collections.shuffle(ps);
4: for (Participant p : ps) {
5:     for (Order o : m.get(p)) {
6:         processAgainstClob(o);
7:     }
8:     m.get(p).clear( );
9: }
```

Line 1 is the Map of market participants 142 to their orders (messages) that were subject to that batch (race).

Line 2 makes a copy of the market participants 142 which are the keys in the Map m.

Line 3 shuffles the (ordered) list of market participants 142, in a way such that every market participant 142 has a substantially equal chance of appearing at each position in the list.

Line 4 begins a for-loop that iterates over market participants 142 based on the order they were shuffled into.

Line 5 iterates over the market participant's orders.

Line 6 processes the market participant's order against the CLOB.

Line 8 clears the list of orders associated with a market participant (if for no other reason than to be consistent with the previous round robin draining example where the orders are actually removed from the list after they have been processed).

A non-limiting example is provided by way of illustration and not limitation. If the batch contains orders a1, a2, and a3 from participant A, and order b1 from participant B, and orders c1 and c2 from participant C then the Map m can be represented as follows:

{A→[a1,a2,a3]; B→[b1];C→[c1,c2]}

If the shuffling of the map's keys (i.e., the participants) results in the ordered list [C,A,B] then the order in which the messages will be processed against the CLOB is as follows:

[c1,c2,a1,a2,a3,b1]

Equitable Quantity Race Draining

In an equitable quantity race draining operation, the system may process a predetermined amount of quantity from each participant's orders at a time, repeatedly iterating over participants until the quantity remaining to be processed against the CLOB is zero for them all. For example, if the predetermined amount of quantity is 1M of base currency on a given foreign exchange instrument (this may correspond to the minimum trade size on the venue and the minimum increment in which order size can change), then 1M of the first participant's first order will be processed against the CLOB, then 1M of the second participant's first order will be processed against the CLOB, and so on until there is no quantity remaining on any participant's orders.

Pseudo-code and accompanying description of an implementation of an equitable maker race draining operation performed by ideal latency floor application 120 is this described below by way of illustration and not limitation. Other implementations of draining operations may be used as well, based on the disclosure provided herein.

```
1: Map<Participant,LinkedList<Order m = ... //m
       contains participant's orders in batch
2: LinkedList<Participant> ps = new
       Linked List<Participant>(m.keySet( ));
3: Collections.shuffle(ps);
4: int remainingOrders;
5: final int splitSize = 1;
6: do {
7:     remainingOrders = 0;
8:     for (Participant p : ps) {
9:         LinkedList<Order> os = m.get(p);
10:        if (os.size( ) > 0) {
11:            Order o = os.removeFirst( );
12:            o.qty -= splitSize;
13:            processAgainstClob(new Order(o,splitSize));
14:            if (o.qty > 0) {
15:                os.addFirst(o);
16:            }
17:            remainingOrders += os.size( );
18:        }
19:    }
20: } while (remainingOrders > 0);
```

The above pseudo-code exemplifies how to drain orders in a way that is cognizant of the sizes (quantities) or those orders so as to arrive at a more equitable outcome with respect to total quantity submitted in a race, irrespective of the number of orders across which that quantity was submitted, for participants in that race. As a draining strategy it may be sensibly used in both maker races to ensure all participants in a race get some quantity near the front of the temporal queue or orders at each price level in the CLOB, and in taker races to attempt to ensure all participants get a share of the (finite) quantity of the bid or offer order(s) being lifted.

Line 1 is the Map of market participants 142 to their orders (messages) that were subject to that batch (race).

Line 2 makes a copy of the market participants which are the keys in the Map m.

Line 3 shuffles the (ordered) list of participants, in a way such that every market participant has a substantially equal chance of appearing at each position in the list.

Line 4 is the variable that will hold the count of remaining orders; each iteration of the do-while loop beginning on line 5.

Line 5 defines the split size for the orders. Its value may sensibly be to the minimum order size on the trading venue, or some other "small" value. For the purposes of this example it is assumed to be 1, and all orders are assumed to have quantity strictly greater than 0, with quantity a whole number (not fractional number).

Lines 6-20 are structurally similar to the round-robin draining operation pseudo-code example in that the for-loop beginning on Line 8 causes the equitable quantity race draining operation to repeatedly iterate over the list of participants until each participant's list of orders is reduced to size zero. The key difference though is that instead of removing an order and processing it, the equitable quantity race draining operation instead removes it, decrement its quantity by the split size and create a "child" order with quantity equal to the split size, and all other properties of the child order are to be inherited from its "parent". The decrementing of the parent order quantity, which ensures the sum of the sizes (quantities) of the child orders are equal to the parent's order size, is performed on line 12. The "child" order is processed against the CLOB in line 13, noting the "parent" order is never processed against the CLOB. Line 14 checks to see whether the parent order has remaining quantity on it. If so, it is re-added to the front of the list of orders for that participant from which it was previously removed (on Line 15). If the parent order's quantity is exhausted (i.e., its quantity is not strictly greater than zero) then it is not re-added to the list because it has been fully split up into child orders all of size "splitSize". Per the first technique, the equitable quantity race draining operation keeps track of the number of orders remaining in the lists after each iteration of the do-loop on Line 17.

```
1: class Order {
2:     int qty = 0;
3:     Order parent;
4:     Order(Order parent, int qty) {
5:         this.parent = parent;
6:         this.qty = qty;
7:     }
8:     //...additional methods/fields on Order as required
9: }
```

The above nine lines of pseudo-code is a partial implementation of the Order class used in the example of the equitable maker race draining operation described above. The qty field of Line 2 stores the order's quantity (size). The (optional) parent field of Line 3 stores the parent order. In this context, the parent order is the order that was subject to the splitting in this draining mechanism. The constructor beginning on line 4 assigns values to the fields. Line 8 is a comment indicating that a full implementation of an Order class would likely contain additional fields to store information such as limit price, time-in-force and so on.

If the split size is 1, and market participant A submits orders a1:2, a2:1, market participant B submits an order b1:2, and market participant C submits an order c1:4 (where the number following the colon ":" is the size of the order), and the result of shuffling is the ordering [B,A,C] then the resulting ordering of "child" orders that will be processed against the CLOB is:

[b1:1,a1:1,c1:1,b1:1,a1:1,c1:1,a2:1,c1:1,c1:1]

Handling Orders Relating to Replace Messages in the Ideal Latency Floor Mechanism Cancel-Replace requests (herein simply "replaces" or "replace messages") are widely used by market participants on many electronic trading venues. A replace message, in one atomic operation, cancels an existing order in the CLOB and contingent on the success of that cancellation it creates a new order at a new requested price level and new requested quantity. The old order and new order in a replace request will have the same side (e.g., a buy order cannot be replaced with a sell order). The replace message will be rejected (i.e. no new order created) if the old order was filled while the replace message was "in flight" between the market participant who sent it, and the trading venue that received it. The ideal latency floor mechanism may handle such replace messages in various ways.

Splitting the Replace Messages into a Cancel Message and a New Order Message

In an implementation, the ideal latency floor mechanism may handle a replace message is by splitting the replace message into two parts inside the mechanism (a cancel message, and a new order message) and handle each of those separately in the mechanism. In doing so, the ideal latency floor mechanism must ensure that if the cancel fails, the new order does not get submitted into the CLOB. Furthermore, the ideal latency floor mechanism must ensure that the cancel message "extracted" from the replace is always processed against the CLOB before the new order that was also "extracted" from it. Additionally, the ideal latency floor mechanism must ensure that the open quantity of the new order reflects any fills that occurred on the old order (i.e., the existing order subject to the replace) up to the point in time it was canceled.

One advantage of splitting the replace message inside the ideal latency floor mechanism is that the mechanism may have configuration parameters describing how to handle cancels and new orders with respect to batches (races) per Table 2, but no explicit configuration parameters on how to handle replaces per-se. Those existing parameters would apply to the new order and the cancel extracted from the replace, but with the caveat that the cancel must be processed before the new order. Thus, the ideal latency floor mechanism would have to ensure that the cancel is processed before the new order (and may require some degree of communication between two batch/race instances). Also, the interface through which the ideal latency floor mechanism communicates with the CLOB would have to likewise ensure that it operates in a manner that the cancel is processed before the new order.

To support splitting of replaces into cancels and new orders a method may be included on the interface to the CLOB used by the ideal latency floor mechanism to process a cancel message as follows:

Order processCancel(Msg cxl)

In this method an Order object is returned from the CLOB when a cancel message is processed by it. If the open quantity on the returned order is zero, or the order object itself is null, then that may indicate the new order extracted from the replace should not be sent into CLOB. Furthermore, since the quantities referred to in a FIX protocol replace message typically pertain to the order's "original quantity" (and not its "open quantity"), if the sum of the order's "open quantity" and "cumulative quantity" is less than the new "original quantity" as specified in the replace message, that should either cause the replace to be rejected, or the original order to be canceled without sending of a new order. What happens in that situation depends on how the specific venue handles that particular situation (some venues may reject the replace outright, and some simply cancel the original order without allowing the new one to be entered).

Another advantage of splitting the "replace" message into a cancel and new order is that the cancel will not be delayed if the configuration parameters of the ideal latency floor are set to process cancels in real-time i.e., not to include them in batches at all. Market makers generally prefer to be able to cancel their bids and offers in the CLOB without delay.

Natively Handling the Replace Message

In an implementation, the ideal latency floor mechanism may handle the replace message "natively" without splitting up the replace message. Instead, the replace message may be placed into a batch/race (whether that batch is already active, or new meaning the replace is the first message in it) that has the longest (temporal) delay. Often there will be a choice of two batches into which the replace message may be placed: either the taker race batch due to the cancel portion of the replace, or the maker race batch identified by the new limit price in the replace message. Of the two, when there is a choice, the replace message may be placed into the batch whose timer tolls (expires) later.

In this implementation, handling the replace message may still at least in part be dictated by the configuration parameters of the ideal latency floor mechanism. For example, if the mechanism is enabled for taker races only (and not maker races) and the new limit price of the order as specified in the replace crosses the book then it will go in the buy or sell taker batch. The cancelation of the older order will not occur until that taker batch is processed against the CLOB, meaning regardless of the configuration on the mechanism for cancels, the cancel portion of the replace will be delayed. If however, the limit price as specified in the replace does not cross the book then entire replace operation may happen in real-time. In another example, if both maker races and taker races are enabled in the mechanism and the new limit price does not cross the book, then the replace should go in the maker batch for the side and price level. However, if cancels are also enabled in the mechanism, the replace may go in the longer (one which will expire further into the future) of the two batches: either the maker batch, or the taker batch.

Some advantages of the native approach are that a market participant is not "out of the market" (i.e., has no order in the CLOB for any time during which the replace is processed, since it is processed atomically), and it may result in a less complex implementation of the ideal latency floor.

Data Collection from Ideal Latency Floor Mechanism

Data may be collected from the ideal latency floor mechanism to ensure it is operating correctly, and has been implemented correctly. The data should be stored in on a file system or database, such as database 132. In particular for, each message the following should be stored (timestamps should be to at least microsecond precision): 1. Timestamp at which the message was received (before the message hits mechanism or CLOB), 2. Integer reflecting total ordering in which messages we received (before the message hits mechanism or CLOB), 3. Timestamp at which the message was processed against CLOB, 4. Integer reflecting total ordering in which message was processed against CLOB, 5. If message was subject to a batch a unique id that can associate all messages in that batch together, and uniquely identify the batch itself, 6. If message was subject to a batch the timestamp at which it was inserted into the batch, 7. For each batch the entirety of its configuration parameters (delay period it was assigned, whether taker or maker race), 8. The market participant an order was deemed to belong to (noting this may change over time as a firm who is a market participant acquires another such firm, or divests ownership in another), 9. Position in the market participant was assigned in the list after shuffling and before draining, and/or other information that may be collected from the ideal latency floor mechanism to ensure it is operating correctly, and has been implemented correctly.

Ideal latency floor application 120 may itself include different sets of instructions that each program the processor(s) 112 (and therefore computer system 104). For example, ideal latency floor application 120 may include an order reception engine 122, a trigger detection engine 124, a batching engine 126, a grouping engine 128, a randomization engine 130, an order processing engine 132, and/or other instructions that program computer system 104. As used herein, for convenience, the various instructions will be described as performing an operation, when, in fact, the various instructions program computer system 104 to perform the operation.

In an implementation, ideal latency floor application 120 may provide an equal probability of winning the market race to those market participants which sent orders to the system within a batching period triggered by a predetermined criteria or an event (such as a first order being received).

In an implementation, ideal latency floor application 120 may receive one or more orders for a financial instrument from one or more market participants. Ideal latency floor application 120 may batch the orders received from market participants for a batching period in response to a trigger event. For example, the ideal latency floor application 120 may batch orders for a given instrument when: (i) the orders (or messages) trigger the race type and (ii) the order was entered within the batching period and is appropriate for that race type. In an implementation, ideal latency floor application 120 may sort the batched orders by the market participant and provide a resulting list of market participants corresponding to the orders sent during the batching period.

In an implementation, ideal latency floor application 120 may randomly shuffle the resulting list of market participants to generate a processing order. Ideal latency floor application 120 may drain orders from the list of market participant in the randomly shuffled processing order based on the various draining operations described herein.

Receiving Orders from Market Participant

In an implementation, order reception engine 122 may receive one or more orders for a financial instrument from one or more market participants. The market participants may be, but are not limited to, customers, market makers, broker/dealer systems, electronic communication networks (ECNs), and other exchanges. For example, a market maker may include any individual or firm that submits and/or maintains both bid and offer orders simultaneously for the same instrument. A customer may be any entity, such as an individual, group of individuals or firm that engages in trading activity via system 100 and is not a market maker. For example, a customer may be an individual investor, a group of investors, or an institutional investor. In an implementation, the market participants may include a process to enter orders into the ideal latency floor application 120.

Market participants may place various trading orders via the ideal latency floor application 120 to trade financial instruments, such as stocks or other equity securities, bonds, mutual funds, options, futures, derivatives, and currencies, for example. Such trading orders may include bid (or buy) orders, ask or offer (or sell) orders, or both, and may be any type of order which may be managed by ideal latency floor application 120, such as market orders, limit orders, stop loss orders, day orders, open orders, GTC ("good till cancelled") orders, "good through" orders, an "all or none" orders, or "any part" orders, for example and not by way of limitation. In an implementation, a market participant may enter in a single order for a financial instrument. In an implementation, a market participant may enter in multiple orders for a financial instrument. The term order as it is used here is intended to broadly refer to all the forms of messages the electronic trading venue receives from market participants including, but not limited to, cancel requests, replace requests, new order requests and so on.

Orders for an instrument may be defined to compete in a market race if one or more market participants submit orders for a financial instrument which take advantage of a certain market position of that financial instrument. Market race generally fall into two categories: taker races and maker races. A taker race may be identified by the side of the order, and that the order price "crosses" the book (i.e. would fill against the current state of the market based price). A maker race may be identified by the pair of side of the order, and limit price of the order (i.e. an order that does not match against an order of the opposing side that exists in current state of the market). It should be appreciated that the invention may have applicability beyond that of just creating an ideal latency floor mechanism for taker and maker races, as such the systems and techniques are parameterized to enable its wider-applicability.

Detecting a Trigger Criteria or Event

In an implementation, a trigger detection engine 124 may detect one or more trigger events which may indicate the start of a market race. For instance, trigger detection engine 124 may detect one or more predetermined criteria or an event (such as a market data update or a first order being received for a financial instrument) which trigger a market race between market participants, as described herein.

Batching Orders within a Batching Period

According to an aspect of the invention, batching engine 126 may batch one or more orders received from the market participants which were received within a batching period from a detected trigger event. The batching period may be triggered based on a trigger event and may be randomly selected within a bound (e.g., 0.9 ms-1.1 ms). For example, batching engine 126 may group together orders for a financial instrument, for a given race type, which were received within a 1.1 milliseconds after a first order was received for that financial instrument that fulfills predetermined criteria.

In an implementation, the batching period may refer to a period of time in which market participants that respond within a value of a latency floor have an equal chance of winning a market race to make or take a price. Rather, orders may be batched together over a batching period of time, and at the end of that batching period of time, the market participants who submitted orders within the batching period are randomized to provide an order in which the market participant orders are processed. In this case, market participants which provide orders within the value of the batching period may have an equal chance of winning a race in which they choose to compete. In an implementation, the batching period may typically, but not necessarily, be set to a small number such as 2 milliseconds (ms). The value of the batching period may be set by the operator of the electronic trading system. For example, market participants that can respond to a predetermined criteria or an event (such as a market data update or a first order being received for a financial instrument), within the batching period (2 ms), may have a substantially equal chance of winning that race. In an implementation, batching engine 126 may group together one or more orders received from the market participants which were received within the batching period.

In an implementation, batching engine 126 may start or trigger the batching period in response to a trigger event. During the batching period, batching engine 126 may group together one or more orders for a financial instrument which were received within the batching period to form a batch. In an implementation, the temporal order in which the orders are received may be retained. In this case, batching engine 126 may batch the initial order for a financial instrument and all other orders for that same financial instrument that are received with a batching period after the first order was received in the temporal order the orders were received. The batching engine 126 may group together one or more orders when: (i) the orders are all price-compatible with the instrument being raced for and (ii) the order were entered within the batching period. In an implementation, order cancellation requests may also be included in the batch if received within the batching period. Cancels may be included so that the fasters makers may not be able to cancel their orders while all taker orders are subject to the batching period. In an implementation, orders received outside of the batching period are not grouped together and may be stored in the temporal order they are received. With regard to replace orders, batching engine 126 may splits the replace order into a cancel message and a new order message that are processed separately by the batching engine 126.

For example, at an initial market state T=t milliseconds, the ask price of an instrument in the market is 55 and at that price 1 million units of the instrument may be traded. At T=t+1 millisecond, a new passive order is entered inside the spread which may cause a market race between market participants. The new passive order may include an ask price in the market of 53 for the instrument with 1 million units of the instruments being trading at that price. At T=t+1.5 milliseconds, participant A sends an immediate or cancel buy order for 1 million units of the instrument at price 53. At T=t+1.6 milliseconds, participant B sends an immediate or cancel buy order for 1 million units of the instrument at price 54. At T=t+1.7 milliseconds, participant C sends an immediate or cancel buy order for 1 million units of the instrument at price 54. At T=t+1.8 milliseconds, participant D sends a good until cancel buy order for 1 million units of the instrument at price 53. At T=t+3 milliseconds, participant E sends an immediate or cancel buy order for 1 million units of the instrument at price 54. If the batching period of the race is 1 ms and the batch period was triggered from the initial buy order from participant A, the orders from participants A, B, C, and D are grouped together as a batch because they are all price-compatible with the passive order being raced for and they were all entered within the batching period. Because participant E did not send an order within the batching period (T=t+3 milliseconds), the order will not be grouped in the batch with the other market participants.

In an implementation, multiple instances of a batch ("race") may be attached to a single instrument. Care must be taken such that any given order goes to into only one such instance. This may be achieved by making the conditions for triggering a batching period more specific, and by making the condition under which an order is grouped in the batching period more specific. In general such conditions may be mutually exclusive between different instances of batches to avoid ambiguity about which instance of a batch an order or message goes into. For example, in the situation where there are two races occurring simultaneously or slightly overlapping in time: in particular a race to aggress an offer and a separate race to aggress a bid both on a single instrument, there may be two instances of a batch. The condition to trigger the batching period for the ask-aggressor race may be: buy orders that cross the book. The condition for orders to be grouped in the batch when it is in the batching period would be buy orders that cross the book and optionally cancel requests for sell orders. For the bid-aggressor instance, the sides of the orders and cancel requests may be inverted when compared to the ask-aggressor instance. In this way, separate races that interleave in time may continue to have the property that all participants in those races may have an equal chance of winning them. The batching engine 126 may also be configured to include additional instances of the batching period per instrument that processes maker orders of different sides (i.e. orders that are inserted into the bid or ask book) to handle maker-races on an instrument.

Grouping and Randomizing Market Participants

According to an aspect of the invention, grouping engine 128 may sort the orders received within the batching period by market participant. For instance, grouping engine 128 may sort the received orders by market participant and bucket the orders by market participant. As an example, grouping engine 128 may place orders submitted by a market participant into a bucket associated with the market participant. Thus, each order received with the batching period may be associated and grouped by market participant.

In an implementation, grouping engine 128 may generate a resulting list of market participants that submitted orders within the batching period. The resulting list of market participants may include the market participants and their respective orders which were submitted within the batching period. In an implementation, each market participant's orders may be stored in the temporal order in which the market participant submitted that order. For example, batching engine 126 may provide a list of buckets associated with each participant (A-D) which include orders for each market participant that were received during the batching period. Each bucket may be filled with the respective orders for that particular market participant. The ordering of orders within each bucket may remain the temporal order in which the orders were received.

In an implementation, randomization engine 130 may randomly shuffle the resulting list of market participants to generate a processing order for the market participants. For instance, the randomization engine 130 will generate a random processing order for market participants whom submitted orders within the batching period. The processing order may be utilized to determine the order in which market participants' orders received within the batching period are processed. For example, randomization engine 130 may shuffle the resulting list of buckets such that statistically every participant (or equivalently bucket) has a substantially equal chance of being placed in each position in the processing order. The buckets may then generate a list of resulting bucket which may reflect a random ordering for processing.

Thus, a market participant having multiple credit codes, or multiple users, or submitting multiple orders may bestow no advantage to a participant. In an implementation, the market participants are randomization such that each market participant has an equal chance of winning the market race. For instance, in a market race in which four market participants are racing, each market participant has a 25% chance of winning the market race no matter how many orders each marker participant submitted.

Processing Market Participant Orders

According to another aspect of the invention, order processing engine 132 may process the orders according to the processing order of market participants. In an implementation, order processing engine 132 may process the orders from market participants according to the random processing order generated by the randomization engine.

The specific manner in which the processing occurs may be parameterized. For aggressor-races, orders may be processed in the temporal ordering that participant's orders were received from each participant before moving onto the next participant's in the processing order. Maker race orders may be processed differently, for instance, in a round-robin fashion such that the first order from the first participant is processed, then the first order from the second participant is processed, then the first from the third participant is processed, eventually returning to the second order of the first participant if it exists, and so on until all of the orders are processed or the quantity of financial instruments is exhausted. Regardless of the manner in which each participant order may be processed, at the time each order (or cancel request/message in other scenarios) is processed it is matched/processed against the CLOB per a matching process (price compatibility checking, credit checking, TIF checking, MQL checking, etc. In this context "processed against the CLOB" generally means either inserted into the CLOB as a maker order, or matched against an order already in the CLOB as a taker order, or modifying an existing maker order's price or quantity, or canceling that existing maker order thereby removing it from the CLOB. For the avoidance of doubt, "maker orders" add or provide liquidity to the CLOB; taker orders consume liquidity from the CLOB.

In an implementation, order processing engine 132 may divide the quantity of a financial instrument among market participants. In this case, if the quantity raced for is 5M, then 1M (or the minimum trade size on the venue) may be attempted to be matched against the orders by the first market participant on the processing order, then the next 1M by the second market participant, and the next 1M by the third market participant and so on. If there is more quantity after processing the market participants a first time, the orders from the market participants are processed in order again in the same manner. For example, each "slice" of the maker quantity is matched against the list of orders from the market participants until one is found that it can match with, in temporal order. If one is not found then the quantity is tried against the orders for the next participant. The distribution of maker quantity among market participants concludes when all the maker quantity is exhausted (matched) or when no more can be matched against the market participant orders because of credit incompatibility. Advantageously, this implementation divides quantity raced for more equitably among the market participants. Since there is likely no correlation between race winner and quantity raced for in practice, over a long time horizon winning an equal number of races will also equate to winning an equal amount of quantity raced-for.

In an implementation, order processing engine 132 may process orders received outside the batching period in a temporal order. For example, order processing engine 132 may process orders received outside the batching period in the order they are received. It should be appreciated that the order processing engine 132 may not process the orders received outside the batching period until those orders within the batch are processed.

Examples of System Architectures and Configurations

Different system architectures may be used. For example, all or a portion of ideal latency floor application 120 may be executed on a server device. In other words, computing device 110 as illustrated may include a server device that obtains a user request from a user device operated by the user. In implementations where all or a portion of ideal latency floor application 120 is executed on the server device, the server device may perform the functionality of the ideal latency floor application 120.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2:
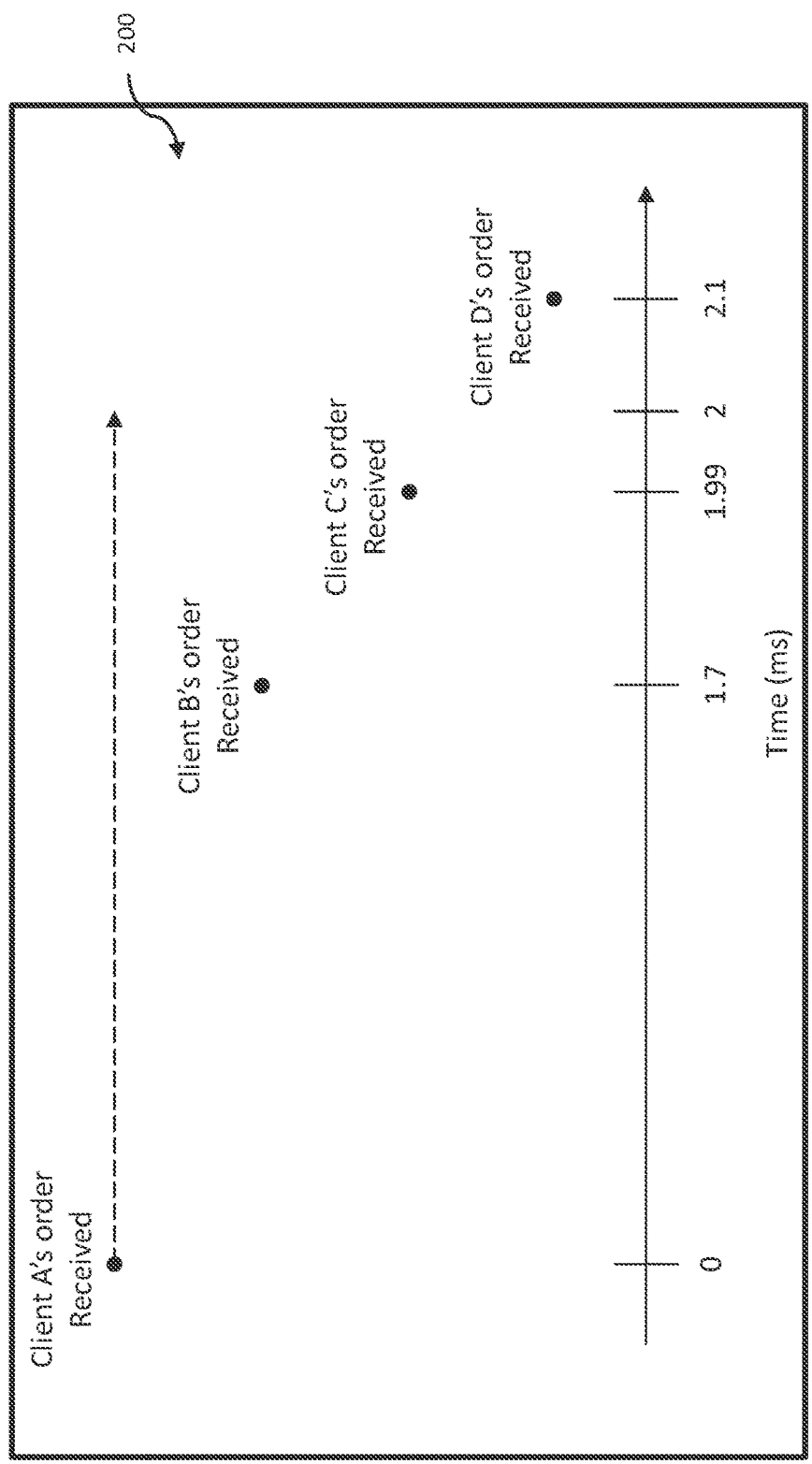
FIG. 2 depicts an exemplary diagram for a process of providing an ideal latency floor mechanism, according to an implementation of the invention.

FIG. 2 depicts an exemplary diagram 200 for a process of providing an ideal latency floor mechanism, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

As an exemplary implementation, client A's order for a particular financial instrument may be the first order in a given market race type (e.g. aggress the market, peg the top-of-book bid, top-of-book-offers, etc.). Once client A's order is received, the batching period (i.e. two millisecond period until orders are processed) may be started and client A's order may be added to a batch [A]. Client B's order for the financial instrument may be received at t=1.7 milliseconds after the start of the batching period. Since client B's order is within the batching period, client B's order may be added to the batch [A, B] along with client A's order. At t=1.99 milliseconds after the start of the batching period, client C's order may be received for the financial instrument. Because client C's order is within the batching period, client C's order may be added to the batch [A, B, C] along with client A's and B's orders. At t=2 milliseconds, the batching period for the financial instrument may be closed. In an implementation, the orders within the batch [A, B, C] may be given an equal chance of being processed. For example, the batch may be shuffled randomly and may be processed in one of these random orders: B(Process_Order(A, B, C)), B(Process_Order(A, C, B)), B(Process_Order(B, A, C)), B(Process_Order(B, C, A)), B(Process_Order(C, A, B)), or B(Process_Order(C, B, A)). Since clients A, B, and C have responded within the batching period, clients A, B, and C have an equal chance of being processed first. With continuing reference to FIG. 2, because client D's order was received at t=2.1 milliseconds and was outside of the batching period, client D's order will be processed after the orders of client A, B, and C. In an implementation, any order received outside of the batching period may be processed in the order in which they are received, or subject to an entirely new batch.

Figure 3:
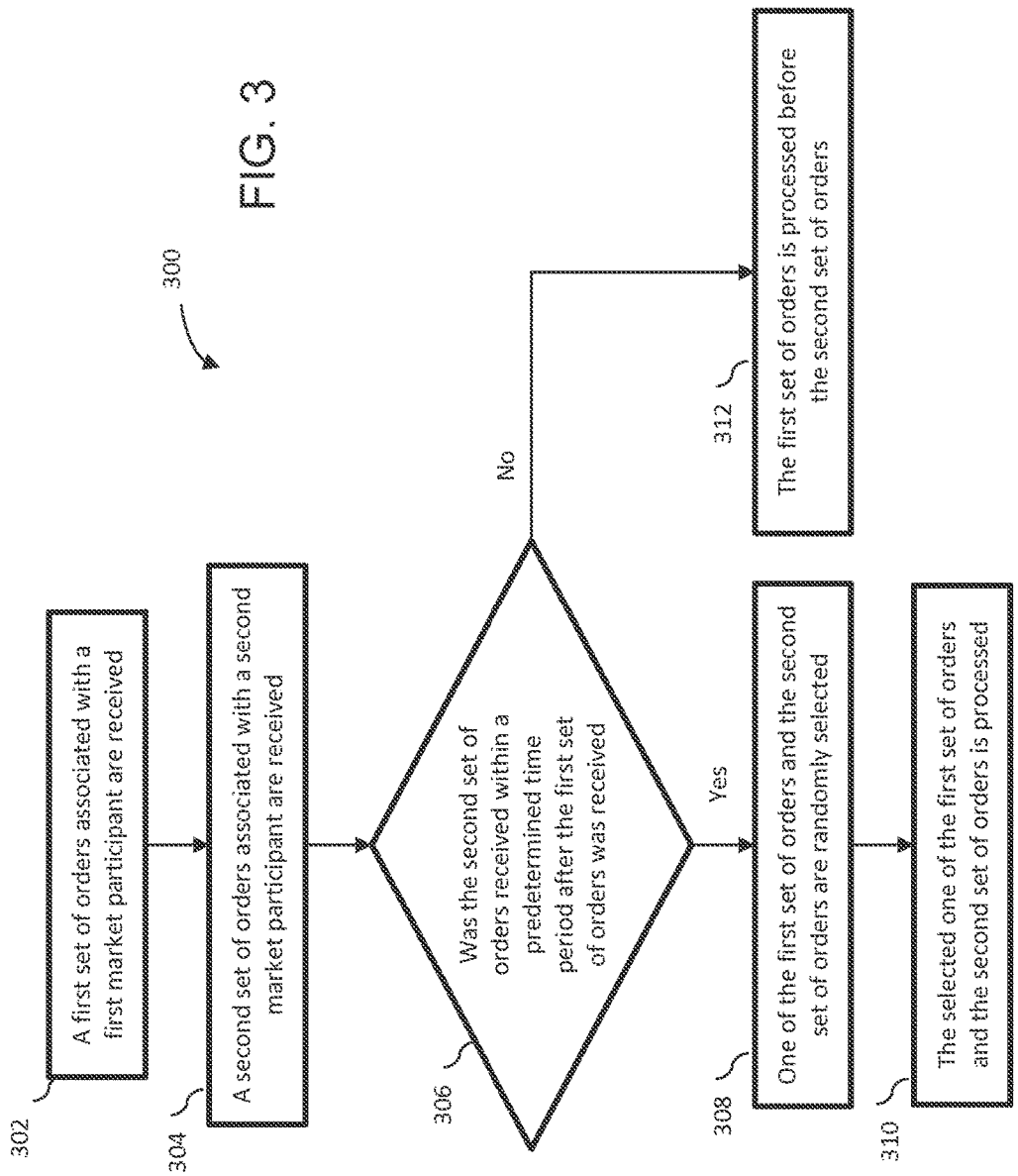
FIG. 3 depicts a process flow diagram for a process of providing an ideal latency floor mechanism, according to an implementation of the invention.

FIG. 3 depicts a process flow diagram 300 for a process of providing an ideal latency floor mechanism, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, a first set of orders associated with a first market participant are received. The term order as it is used here is intended to broadly refer to all the forms of messages the electronic trading venue receives from market participants including, but not limited to, cancel requests, replace requests, new order requests and so on.

In an operation 304, a second set of orders associated with a second market participant are received.

In an operation 306, it is determined if the second set of orders was received within a batching period after the first set of orders was received.

If the second set of orders was received within a batching period after the first set of orders was received, one of the first set of orders and the second set of orders are randomly selected in an operation 308. The batching period may be triggered based on a predetermined criteria or an event (such as a market data update or a first order being received for a financial instrument) and may be randomly selected within a bound (e.g., 0.9 ms-1.1 ms).

In an operation 310, the selected one of the first set of orders and the second set of orders is processed. It should be appreciated that the resulting list of buckets may be shuffled such that statistically every participant (or equivalently bucket) has an equal chance of being placed in each position in the processing order.

If the second set of orders was not received within a batching period after the first set of orders was received, the first set of orders is processed before the second set of orders in an operation 312.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

Figure 4:
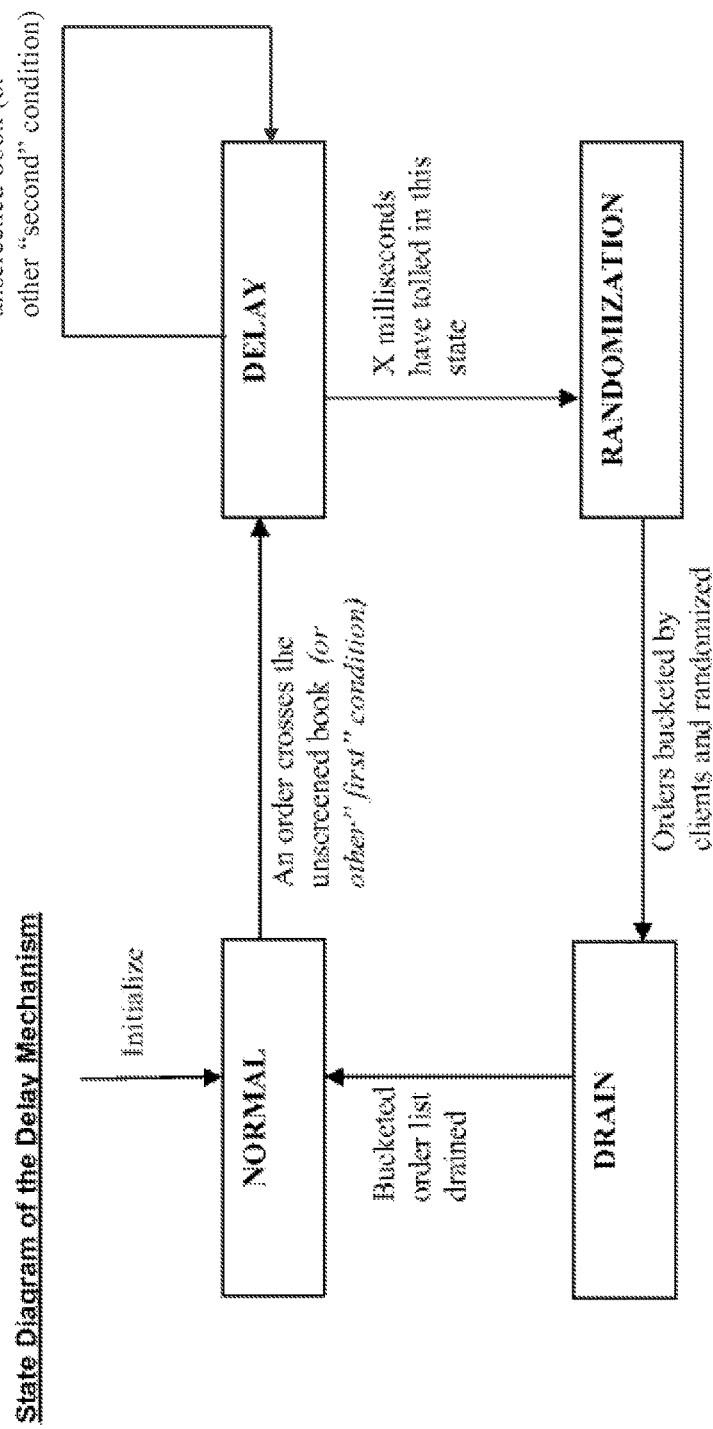
FIG. 4 depicts an exemplary diagram that illustrates various states of a delay mechanism, such as an ideal latency floor mechanism, according to an implementation of the invention.

FIG. 4 depicts an exemplary diagram that illustrates various states of a delay mechanism, such as an ideal latency floor mechanism, according to an implementation of the invention.

A delay mechanism may have several states which are processed by various software modules configured in the system. The state of the mechanism determines its behavior. Different instances of the mechanism operate independently of each other, and in general there may be many instances of the mechanism per instrument. For reasons described above the mechanism is parameterized on each of the following: (1) the condition that causes it to enter the DELAY state, on (2) the messages i.e., orders, cancels, replaces etc it accepts when in the DELAY state, and on (3) the manner in which the market participant buckets are drained in the DRAIN state.

When instantiated on a given instrument, the mechanism is initialized to the "NORMAL" state. When the system is in the NORMAL state and an order (or message) is received that meets the given condition the mechanism enters the "DELAY" state. For aggressor races the specific condition the mechanism implements to enter the DELAY state is an order received that crosses the book i.e., an order received that is priced such that, without regard to credit, it may be matched against (aggress) the opposite side of the market. The time-in-force of the order that crosses the book may be immaterial i.e., it may be an IOC or a regular GTC order; the key observation is that the order is priced such that it would aggress the (unscreened) market based off the current state of the central limit order book. (Current state may be the "true" state of the central limit order book, not what was last sent out of the venue in is market data updates)

In the DELAY state the initial order and all other orders (or messages) that meet a given criteria or condition are queued up in the order they are received for a period of X milliseconds (ms) after the first order is received. X will typically be a small number, and may be whole or fractional number. X may also vary randomly within some bounds (e.g., 0.9 ms-1.1 ms) if it is desired to establish a "latency floor" having some variation. Regardless, once the X ms have tolled the mechanism next enters the "RANDOMIZATION" state. For aggressor races the criteria for messages to collect in the DELAY state is that they are orders that also cross the unscreened book, and optionally all order cancellation requests. The rationale for including cancels is may be that we do not want the fastest makers to be able to cancel their orders while all taker orders are subject to a delay period; the rationale for excluding them is that cancel requests may already get priority over order messages in the venue's preexisting implementation.

In the RANDOMIZATION state the queue of orders (or messages) are bucketed by market participant, so all a participant's orders (regardless of user, credit code etc) go into single bucket for that client. In one embodiment, a (market) participant is an organization such as a bank or prime-brokerage client, and not a specific user (person) or credit code. In this way having multiple credit codes, or multiple users, or submitting multiple orders bestows no advantage to a participant. The resulting list of buckets is then randomly shuffled and the result of this is the system enters the "DRAIN" state. The random shuffling may be implemented such that statistically every participant (or equivalently bucket) has an equal chance of ending up in each position in the resultant list of buckets. The ordering of orders (or messages) that were subject to this delay for a given participant is retained when they are put into that client's bucket.

In the DRAIN state the system drains the orders from the buckets in the order determined by the bucket ordering. The specific manner in which the draining occurs is parameterized. For these aggressor-races all orders are drained from each participant's bucket before moving onto the next participant's in the list, in the temporal ordering that participant's orders were received. Advantageously this mechanism may be used elsewhere e.g., for maker races orders (message) may be drained differently, for instance, in a round-robin fashion or an equitable quantity fashion. Regardless of the manner in which each client order is removed from the buckets, at the time each order (or cancel request/message in other scenarios) is removed it is matched/processed against the central limit order book per a matching process (price compatibility checking, credit checking, TIF checking, MQL checking etc). Once all buckets are drained the mechanism reverts to the NORMAL state.

Appendix A includes an example of instructions used to implement an ideal latency floor mechanism according to the parameters described in Table 2, which is provided by way of illustration and not limitation. As would be apparent based on the disclosure herein, other sets of instructions may be used as well.

illustration and not limitation. As would be apparent based on the disclosure herein, other sets of instructions may be used as well.

```java
import java.util.ArrayList;
import java.util.Collections;
import java.util.HashMap;
import java.util.Iterator;
import java.util.LinkedHashMap;
import java.util.LinkedList;
import java.util.List;
import java.util.Map;

public class IdealLatencyFloor { public static void main(String[] args) throws Throwable {

//Maker_Races:Boolean
        boolean makerRaces = false;
        //Taker_Races:Boolean
        boolean takerRaces = false;

//Cancels_In_Batching:Boolean
        boolean cancelsInBatching = true;

//Cancels_Trigger:Boolean
        boolean cancelsTrigger = false;
```

```
//Floor_Upper:double
double floorUpper = 2.0;
//Floor_Lower:double
double floorLower = 2.0;

//Maker_At_Once:Boolean
boolean makerAtOnce = false;

//Taker_At_Once:Boolean
boolean takerAtOnce = true;

//this is the queue of inbound messages for an instrument
//normally it'd be populated by a thread framing messages from a
//socket or similar
final Queue<Msg> inboundMsgs = new Queue<Msg>();

//this is the map of races that are currently active i.e. a batch
//in this map has not been shuffled and drained yet
final LinkedHashMap<PriceSide,Batch> activeRaces = new
LinkedHashMap<PriceSide,Batch>();

//this is the central limit order book for an instrument
//each instrument would have one instance of this object
//storing all its maker orders
final CLOB clob = new CLOB();

//we "spin" in this loop while the market is open. "spinning" isn't the
```

```
//most efficient thing to do, but our purpose here is to convey a simple
//implementation, not necessarily the most efficient one
while (true) {

//iterate over all the active races in the system. note that activeRaces is
    //deliberately a LinkedHashMap, so when multiple timers have all expired
    //"at once", we process the batches based off their creation date--
    //batches/races created earlier will be processed before those created
    //later when many have expired "at the same time".
    for (Iterator<PriceSide> it = activeRaces.keySet().iterator(); it.hasNext();) {

//this is the key that identifies a race/batch
        PriceSide key = it.next();

//this is the batch itself, guaranteed by the implementation to be non-null
        Batch batch = activeRaces.get(key);

//if this expression is true then the timer for a batch has expired, and we must drain
        //that batch. As noted earlier, when we are inside this for loop multiple batches may
        //have expired, and in that case we will deliberately process them by the time the first
        //order/message in the batch was received. So batch containing the oldest order will be
        //processed first when multiple batches have all expired "at once".
        if ((batch.startTimeMillis + batch.periodMillis) <= System.nanoTime() / 1000000.0) {

//there are two separate configuration parameters for how to drain
            //the queue. one is for taker races, one is for maker races. we choose
            //the right one here, based off the race type which is stored in Batch
            boolean drainAtOnce = batch.isTakerRace ? takerAtOnce : makerAtOnce;
```

```
//the logic for draining the batch i.e., doing the randomization of
//orders in a specific race type lives inside of the Batch class.
batch.shuffleAndDrain(clob,drainAtOnce);

//if we have fallen through to here we've finished draining the orders
//from this batch, and we remove this batch (and its key) from the list
//of active races, so we don't process it again and so we keep the size of
//our activeRaces map small
it.remove();
}

}

//if there are inbound messages from the socket serving the specific instrument
//then process them by draining all of those messages at once. if there are not,
//any inbound messages this iteration of the while loop then assume this method
//is non-blocking i.e. that it returns an empty list of messages.
//NB: we cannot block here waiting for new messages because we constantly need
//to be checking in the above for-loop for batching periods/active races have
//expired/tolled.
for (Msg msg : inboundMsgs.drain()) {

//if this expression is true, the mechanism totally is disabled,
//so we process all messages in real-time, as they're received
```

```
if (!takerRaces && !makerRaces) {
  clob.process(msg);
    continue;
}

//if this expression is true then cancels are not included in the
//batching mechanism so should be processed in real-time, as
//they are received
if (!cancelsInBatching && msg.isCancel()) {
  clob.process(msg);
    continue;
}

//this is the limit price and side of the order as a
//2-tuple. For cancel messages, it is the price and side of
//the order being canceled. The variable priceSide will be the
//"key" that identifies a race in our activeRaces map
PriceSide priceSide = msg.priceSideKey();

//since cancels, when they are processed by the mechanism,
//are grouped with taker orders, their key needs to have its
//price set to null. Further, since a race to cancel a bid
//competes with a sell order to hit that bid, the side on
//cancels is reversed when it comes to grouping by race type.
//make these "corrections" to a cancel's key in this block
if (msg.isCancel()) {
  priceSide.price = null;
```

```
  priceSide.isBuy = !priceSide.isBuy;
}
```

```
//this block of code determines if the order message "crosses" the book or not,
//i.e., if the order would match on entry against the "real-time" book
//(cf. conflated, market data book), ignoring credit
boolean orderCrossesBook = false;
if (!msg.isCancel()) {
  orderCrossesBook = (priceSide.isBuy && priceSide.price >= clob.getAskPrice())
      || (!priceSide.isBuy && priceSide.price <= clob.getBidPrice());

//if it does appear the order would match on entry, set the price field of
  //the 2-tuple to null, so that ultimately all taker orders will be batched by
  //side only, and not by price
  if (orderCrossesBook) {
    priceSide.price = null;
  }

}

//if this expression is true then the mechanism is disabled for taker races
//and we should process all cancels and taker orders in real-time, in the order
//in which they are received
if (!takerRaces && (orderCrossesBook || msg.isCancel())) {
  clob.process(msg);
  continue;
}
```

```
//if this expression is true then the mechanism is disabled for maker races
//and we should process all maker orders in real time, but we should not process
//cancels here because those cancels might be included in taker races
if (!makerRaces && !orderCrossesBook && !msg.isCancel()) {
  clob.process(msg);
  continue;
}

//here we are obtaining the Batch of messages for the specific race instance
Batch batch = activeRaces.get(priceSide);

//if this expression is true then this race is not currently active because
//it hasn't been triggered yet. The logic inside this block determines
//whether the race has actually been triggered, or not.
if (batch == null) {

//if this expression is true, then we have not triggered a race
  //because the configuration parameter specifies cancels cannot trigger
  //races. therefore, process the cancel in real-time, as it was received
  if (!cancelsTrigger && msg.isCancel()) {
    clob.process(msg);
    continue;
  }
```

```
//we need to store a bunch of information when a race is triggered,
//whether its a maker or taker race, what its actual delay period is
//and we do all of this in fields of the batch object.
batch = new Batch();

if (msg.isCancel()) {
 //if we have fallen through to here then the configuration parameter
 //named cancelsTrigger must be true.

//even when cancelsTrigger is true, we only want to start a race
 //when the specific cancel was for an order at top of book
 boolean cancelAtTob = (msg.isBuy() && msg.getPrice() == clob.getBidPrice())
    || (!msg.isBuy() && msg.getPrice() == clob.getAskPrice());

//if the cancel was not for an order at top of book then process
 //it in real-time, as it was received
 if (!cancelAtTob) {
  clob.process(msg);
  continue;
 }

//if we have fallen through to here then the cancel has indeed started
 //a taker race.
 batch.isTakerRace = true;
```

```
} else {

//if we fall through to here we know we have an order message, and not a
    //cancel message. And from earlier logic we can discern if this order is for
    //a taker or a maker race. Furthermore, earlier we set the key to have a null
    //price so no need to do this again
    batch.isTakerRace = orderCrossesBook;
}

//this sets the length of time the batch's timer will run for before we
//shuffle and drain the orders against the CLOB. All while being
//careful with double arithmetic. Note the javadoc for Math.random()
//gives us the property we desire--uniform, continuous distribution
//between [0,1) which we scale appropriately between floorLower and
//floorUpper
batch.periodMillis = Math.max(
    floorLower,
    (Math.random() * (floorUpper-floorLower)) + floorLower
);

//this sets the time the first order in the batch was received, which
//is used to "start" the timer
batch.startTimeMillis = msg.getReceiveTimestamp();

//store this batch with the other active races. the implementation
//guarantees that activeRaces.get(priceSide) == null is true, i.e.,
//that we are not overwriting an existing batch, which would be very, very
```

```
        //bad because its orders will never be drained (processed against the CLOB)
        //if we were to do that
        activeRaces.put(priceSide,batch);
    }

//if we have fallen through to here then our batch object has been
    //created or already existed, and we need to add the message to the batch
    batch.add(msg);

}

}

} static class CLOB {

//STUB: this method causes a message (cancel or order) to be processed
//immediately against the Central Limit Order Book. For the avoidance
//of doubt "processing against the CLOB" means applying the message to the
//CLOB by price checking the opposite side of the market for a possible match,
//credit checking for a possible match, inserting the order into the book,
//matching the order, removing the order from the book and so on.
```

```
void process(Msg msg) {}

//STUB: this method would return the top of book bid price
//as it appears in the host (cf. last market data update)
Double getBidPrice() {return null;}

//STUB: this method would return the top of book ask price
//as it appears in the host (cf. last market data update)
Double getAskPrice() {return null;}
} static class Queue<T> {

//STUB: this method returns a list of messages that have
//accumulated for the instrument. it is non-blocking so
//if no messages have accumulated it returns and empty list
List<T> drain() {return null;}
} static class Msg {

//STUB: this method returns true for cancels,
//and false for orders
Boolean isCancel() {return null;}

//STUB: this method returns a 2-tuple of
//{price,side} where side is true for buys and
```

```
//false for sells. For cancel messages it returns
//the side and the price of the order being canceled
PriceSide priceSideKey() {return null;}

//STUB: this method returns the timestamp at which the host
//received the message, accurate to microseconds or better
Double getReceiveTimestamp() {return null;}

//STUB: this method returns an object that represents the
//organization (aka participant/firm) that sent the message
Object getOrganization() { return null; }

//STUB: this method returns the price of the order, or the order
//the cancel message applies to
Double getPrice() {return null;}

//STUB: this method returns the side of the order, or the order
//the cancel message applies to. true is for buy, sell is for false.
Boolean isBuy() {return null;}
} static class Batch {

//stores the next id that will be assigned to a batch
private static int nextBatchId = 0;

//the actual batch's id
```

```
final int batchId;

//this is the duration of the floor
Double periodMillis;

//this is the start time of the race/batching period
Double startTimeMillis;

//this specifies whether the race is a maker race or taker race
boolean isTakerRace;

//this map is from organization to the list of messages that org sent
final Map<Object,List<Msg>> orgToMsgs = new HashMap<Object,List<Msg>>();

Batch() {
  //we need to be able to uniquely identify an instance of a
  //race or batch, and all the orders in it. So each time
  //a batch object is create it gets assigned a unique id.
  batchId = nextBatchId++;
} void add(Msg msg){
  //messages must be grouped by organization, and that is what
  //is happening in the code below. the key of the map is the
  //organization, and the value of the map is the list of orders
  //from that organization. NB: the ordering of orders *within* an
  //organization is purposefully retained with this code
  List<Msg> msgs = orgToMsgs.get(msg.getOrganization());
```

```
if (msgs == null) {
  msgs = new LinkedList<Msg>();
  orgToMsgs.put(msg.getOrganization(),msgs);
}

//this method, per the javadoc, adds the msg to the end of the list
//thereby retaining temporal ordering within a given organization
msgs.add(msg);

} void shuffleAndDrain(CLOB clob, boolean drainAtOnce) {
  //we need to store the list of organizations in this race in
  //a form we can reorder it. The (key)set of hashmap won't do
  //that for us so we make a copy here.
  List<Object> orgs = new ArrayList<Object>(orgToMsgs.keySet());

//now we shuffle that list of client organizations, such that, per
  //the javadoc for Collections.shuffle(), each organization has an
  //equal probability of appearing at each position of the list
  Collections.shuffle(orgs);

if (drainAtOnce) {
    //if we fall through to here we drain all of an organization's
    //messages before moving onto the next organization's messages.
    //NB the order in which the a specific organization's messages
```

```
//is drained is the same order in which that organization sent
//those messages.
for (Object org : orgs) {
  for (Msg msg : orgToMsgs.get(org)) {
    clob.process(msg);
  }

//clear the list to keep the implementation consistent
  //between the two draining strategies (this one and the
  //below one)
  orgToMsgs.get(org).clear();
}
} else {
//if we fall through to here then we need to iterate over
//the organizations repeatedly, in the ordering of 'orgs',
//taking one message from an organization at a time, until
//there are no organizations left. Again, the relative
//ordering of messages within a given organization is the
//same as the ordering those messages were received.
while (orgs.size() > 0) {
  for (Iterator<Object> it = orgs.iterator(); it.hasNext();) {
    Object org = it.next();
    List<Msg> msgs = orgToMsgs.get(org);

//remove and process the next order for this organization
    clob.process(msgs.remove(0));

if (msgs.size() == 0) {
```

```
                //if we fall through to here the organization
                //has no orders left to drain. so we don't
                //need to keep visit it anymore.
                it.remove();
              }
            }
          }
        }

}

} static class PriceSide {
  Double price;
  boolean isBuy;

//hashCode() and equals() unimplemented, but
  //if both prices are equal, and both sides are equal
  //then the two PriceSide objects are equal
}

}
```

What is claimed is:

1. A computer implemented method of providing a latency floor for a market race, the method being implemented in a computer system having one or more physical processors programmed with computer program instructions that, when executed by the one or more physical processors, cause the computer system to perform the method, the method comprising:
    receiving, by the computer system, a first order associated with a first market participant for a financial instrument at a first time;
    triggering, by the computer system, a first market race associated with the financial instrument responsive to receipt of the first order;
    defining, by the computer system, a batching period for the first market race based on the first time at which the first order is received and a predefined length of time;
    receiving, by the computer system, a second order associated with a second market participant for the financial instrument at a second time within the batching period;
    generating, by the computer system, a batched set of orders based on the first order and the second order in a sequence in which the first order and the second order were received;
    storing, by the computer system, the batched set of orders based on the sequence in which the first order and the second order were received;
    determining, by the computer system, that an end of the batching period has occurred;
    generating, by the computer system, a list of market participants from which one or more orders were received during the batching period, the list of market participants including at least the first market participant and the second market participant;
    shuffling, by the computer system, the list of market participants to create a random ordering of the market participants; and
    selecting, by the computer system, an order from the batched set of orders based on the random ordering of the market participants responsive to the determination that the end of the batching period has occurred.

2. The method of claim 1, the method further comprising:
    receiving a third order associated with a third market participant for the financial instrument at a third time;
    determining that the third order should trigger a second market race associated with the financial instrument that is different from the first market race; and
    triggering the second market race associated with the financial instrument responsive to a determination that the third order should trigger the second market race.

3. The method of claim 2, wherein the second market race is triggered during the batching period such that at least a portion of the first market race and at least a portion of the second market race occur simultaneously.

4. The method of claim 3, wherein the first market race is of a first type of market race and the second market race is of a second type of market race different from the first type.

5. The method of claim 1, the method further comprising:
    storing the first order or the second order until expiration of the batching period.

6. The method of claim 1, the method further comprising:
    receiving a third order associated with the first market participant for the financial instrument at a third time within the batching period;
    generating a first set of orders from the first market participant based on the first order and the third order; and
    generating a second set of orders from the second market participant based on the second order.

7. The method of claim 6, wherein a manner in which the order is randomly selected from among the first set of orders or the second set of orders is determined based on a type of the first market race.

8. The method of claim 6, wherein the first set of orders satisfy a first predefined condition and the second set of orders satisfy a second predefined condition.

9. The method of claim 6, the method further comprising:
    obtaining a split size that defines an amount of an order's quantity to be processed at a given time;
    selecting the first market participant based on the random ordering;
    decrementing the amount of the order's quantity on the first set of orders based on the split size;
    causing the amount of the order's quantity on the first set of orders to be drained;
    selecting the second market participant after the first market participant based on the random ordering;
    decrementing the amount of the order's quantity on the second set of orders based on the split size;
    and causing the amount of the order's quantity on the second set of orders to be drained.

10. The method of claim 1, wherein randomly selecting the order from the batched set of orders comprises:
    selecting, by the computer system, the first order from the first market participant; and
    selecting, by the computer system, the second order from the second market participant.

11. The method of claim 10, wherein the batched set of orders include a first set of orders from the first market participant and a second set of orders, including the second order and at least one other second order, from the second market participant, the method further comprising:
    maintaining, by the computer system, a first sequence in which each of the orders in the first set of orders were received;
    maintaining, by the computer system, a second sequence in which each of the second orders in the second set of orders were received;
    wherein selecting the first order comprises selecting the first order and remaining orders from the first set of orders before selecting the second order; and
    wherein selecting the second order comprises selecting the second order and remaining orders from the second set of orders after selecting the first set of orders.

12. The method of claim 10, wherein the batched set of orders include a first set of orders, including the first order and at least one other order, from the first market participant, and the batched set of orders include a second set of orders, including the second order and at least one other second order, from the second market participant, the method further comprising:
    maintaining, by the computer system, a first sequence in which each of the orders in the first set of orders were received;
    maintaining, by the computer system, a second sequence in which each of the second orders in the second set of orders were received;
    wherein selecting the first order comprises selecting the first order and not the remaining orders from the first set of orders before selecting the second order;
    wherein selecting the second order comprises selecting the second order and not remaining orders from the second set of orders after selecting the first set of orders;

after selecting the second order, selecting a next first order in the first set of orders from the first market participant; and after selecting the next first order, selecting a next second order in the second set of orders from the second market participant.

13. The method of claim 1, the method further comprising:

processing, by the computer system, the batched set of orders against a central limit order book based on the selected order.

14. A system of providing a latency floor for a market race, the system comprising:

a computer system comprising one or more physical processors programmed by computer program instructions that, when executed, cause the computer system to:

receive a first order associated with a first market participant for a financial instrument at a first time;

trigger a first market race associated with the financial instrument responsive to receipt of the first order;

define a batching period for the first market race based on the first time at which the first order is received and a predefined length of time;

receive a second order associated with a second market participant for the financial instrument at a second time within the batching period;

generate a batched set of orders based on the first order and the second order in the order in which the first order and the second order were received;

store the batched set of orders based on the order in which the first order and the second order were received;

determine that an end of the batching period has occurred;

generate a list of market participants from which one or more orders were received during the batching period, the list of market participants including at least the first market participant and the second market participant;

shuffle the list of market participants to create a random ordering of the market participants; and select an order from the batched set of orders based on the random ordering of the market participants responsive to the determination that the end of the batching period has occurred.

15. The system of claim 14, wherein the computer system is further programmed to:

receive a third order associated with a third market participant for the financial instrument at a third time;

determine that the third order should trigger a second market race associated with the financial instrument that is different from the first market race; and trigger the second market race associated with the financial instrument responsive to a determination that the third order should trigger the second market race.

16. The system of claim 15, wherein the second market race is triggered during the batching period such that at least a portion of the first market race and at least a portion of the second market race occur simultaneously.

17. The system of claim 16, wherein the first market race is of a first type of market race and the second market race is of a second type of market race different from the first type.

18. The system of claim 14, wherein the computer system is further programmed to:

store the first order or the second order until expiration of the batching period.

19. The system of claim 14, wherein the computer system is further programmed to:

receive a third order associated with the first market participant for the financial instrument at a third time within the batching period;

generate a first set of orders from the first market participant based on the first order and the third order; and generate a second set of orders from the second market participant based on the second order.

20. The system of claim 19, wherein a manner in which the order is randomly selected from among the first set of orders or the second set of orders is determined based on a type of the first market race.

21. The system of claim 19, wherein the first set of orders satisfy a first predefined condition and the second set of orders satisfy a second predefined condition.

22. The system of claim 19, wherein the computer system is further programmed to:

obtain a split size that defines an amount of an order's quantity to be processed at a given time;

select the first market participant based on the random ordering;

decrement an amount of the order's quantity on the first set of orders based on the split size;

cause the amount of the first set of orders to be drained;

select the second market participant after the first market participant based on the random ordering;

decrement an amount of the order's quantity on the second set of orders based on the split size; and cause the amount of the second set of orders to be drained.

23. A non-transitory computer readable medium storing computer instructions for of providing a latency floor for a market race, the instructions, when executed by one or more physical processors of a computer system, cause the computer system to:

receive a first order associated with a first market participant for a financial instrument at a first time;

trigger a first market race associated with the financial instrument responsive to receipt of the first order;

define a batching period for the first market race based on the first time at which the first order is received and a predefined length of time;

receive a second order associated with a second market participant for the financial instrument at a second time within the batching period;

generate a batched set of orders based on the first order and the second order in a sequence in which the first order and the second order were received;

store the batched set of orders based on the sequence in which the first order and the second order were received;

determine that an end of the batching period has occurred;

generate a list of market participants from which one or more orders were received during the batching period, the list of market participants including at least the first market participant and the second market participant;

shuffle the list of market participants to create a random ordering of the market participants; and select an order from the batched set of orders based on the random ordering of the market participants responsive to the determination that the end of the batching period has occurred.

24. A computer implemented method of providing a latency floor for a market race, the method being implemented in a computer system having one or more physical processors programmed with computer program instructions that, when executed by the one or more physical processors, cause the computer system to perform the method, the method comprising:

receiving, by the computer system, a first order associated with a first market participant for a financial instrument at a first time, wherein the first order is associated with a first race type;

triggering, by the computer system, a first market race associated with the financial instrument responsive to receipt of the first order;

defining, by the computer system, a batching period for the first market race based on the first time at which the first order is received and a predefined length of time;

receiving, by the computer system, a second order associated with a second market participant for the financial instrument at a second time within the batching period;

determining, by the computer system, whether the second order is associated with the first race type;

generating, by the computer system, a batched set of orders based on the first order and the second order in a sequence in which the first order and the second order were received responsive to a determination that the second order is associated with the first race type;

storing, by the computer system, the batched set of orders based on the sequence in which the first order and the second order were received;

determining, by the computer system, that an end of the batching period has occurred;

generating, by the computer system, a list of market participants from which one or more orders were received during the batching period, the list of market participants including at least the first market participant and the second market participant;

shuffling, by the computer system, the list of market participants to create a random ordering of the market participants; and selecting, by the computer system, an order from the batched set of orders based on the random ordering of the market participants responsive to the determination that the end of the batching period has occurred such that a given market participant that submitted an order among the batched set of orders has a substantially equal probability of having at least one of its orders selected.

* * * * *